US012299970B2

(12) United States Patent
Kakeda

(10) Patent No.: US 12,299,970 B2
(45) Date of Patent: May 13, 2025

(54) APPARATUS, SYSTEM, AND METHOD FOR SUPPORTING SETTING FOR CELL IMAGE ANALYSIS

(71) Applicant: Evident Corporation, Tatsuno-machi (JP)

(72) Inventor: Takatoshi Kakeda, Tokyo (JP)

(73) Assignee: Evident Corporation, Nagano (JP)

( * ) Notice: Subject to any disclaimer, the term of this patent is extended or adjusted under 35 U.S.C. 154(b) by 507 days.

(21) Appl. No.: 17/711,396

(22) Filed: Apr. 1, 2022

(65) Prior Publication Data

US 2022/0319163 A1    Oct. 6, 2022

(30) Foreign Application Priority Data

Apr. 5, 2021   (JP) .................. 2021-064247

(51) Int. Cl.
*G06V 10/94*  (2022.01)
*G06V 10/96*  (2022.01)
*G06V 20/69*  (2022.01)

(52) U.S. Cl.
CPC ............ *G06V 10/945* (2022.01); *G06V 10/96* (2022.01); *G06V 20/693* (2022.01); *G06V 20/695* (2022.01)

(58) Field of Classification Search
CPC ...... G06V 10/945; G06V 10/96; G06V 10/94; G06V 10/778; G06V 10/774; G06V 10/70; G06V 20/69; G06V 20/693; G06V 20/695; G06V 30/12; G06V 30/19113; G06V 30/19147; G06V 2201/03
See application file for complete search history.

(56) References Cited

U.S. PATENT DOCUMENTS

| 2011/0019897 | A1* | 1/2011 | Takagi | G06V 20/695 |
| | | | | 382/133 |
| 2015/0327758 | A1* | 11/2015 | Sakashita | A61B 3/0058 |
| | | | | 351/246 |
| 2017/0350805 | A1* | 12/2017 | Murata | G01N 21/27 |
| 2020/0257937 | A1* | 8/2020 | Krasienapibal | G06V 10/7784 |
| 2021/0081642 | A1* | 3/2021 | Kawakami | G06V 20/69 |

FOREIGN PATENT DOCUMENTS

WO    2018109826 A1    6/2018

\* cited by examiner

*Primary Examiner* — Oneal R Mistry
*Assistant Examiner* — Duy Tran
(74) *Attorney, Agent, or Firm* — Holtz, Holtz & Volek PC

(57) ABSTRACT

The apparatus includes a processor that selects parameter-setting candidate information by referring to a database about a parameter setting history of image analysis that analyzes a cell image, and an output unit that outputs the selected parameter-setting candidate information. The database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing image analysis. The processor, in response to selection of a first parameter as a recognition parameter, selects the parameter-setting candidate information based on combination information including the first parameter in the setting history information.

15 Claims, 19 Drawing Sheets

| RECOGNITION PARAMETER | | ANALYSIS PARAMETER | | EVALU-ATION | NUMBER OF REFER-RING TIMES | PURPOSE OF ANALYSIS | SUMMARY |
|---|---|---|---|---|---|---|---|
| DIMEN-SION | PARENT | CHILD | X AXIS | Y AXIS | | | |
| THREE DIMENSIONS | Spheroid | — | Total Inensity | — | 90/100 | 80 | LUMINANCE ANALYSIS OF Spheroid | ..... |
| THREE DIMENSIONS | Spheroid | — | Circularity Factor | — | 20/50 | 30 | CIRCULARITY ANALYSIS OF Spheroid | ..... |
| THREE DIMENSIONS | Spheroid | — | X | Y | 5/100 | 20 | DISTRIBUTION ANALYSIS OF Spheroid | ..... |
| THREE DIMENSIONS | Spheroid | — | Total Inensity | Y | 5/50 | 10 | DISTRIBUTION ANALYSIS OF Spheroid | ..... |
| THREE DIMENSIONS | Spheroid | Nuclear | Total Inensity | — | 95/100 | 70 | LUMINANCE ANALYSIS OF NUCLEUS | ..... |
| THREE DIMENSIONS | Spheroid | Nuclear | Circularity Factor | — | 10/100 | 35 | CIRCULARITY ANALYSIS OF NUCLEUS | ..... |
| THREE DIMENSIONS | Spheroid | Nuclear | X | Y | 80/300 | 100 | DISTRIBUTION ANALYSIS OF NUCLEUS | ..... |
| THREE DIMENSIONS | Spheroid | Nuclear | Y | — | 10/50 | 20 | DISTRIBUTION ANALYSIS OF NUCLEUS | ..... |
| THREE DIMENSIONS | Spheroid | Nuclear | Count | — | 85/100 | 85 | NUMBER COUNT OF NUCLEUS | ..... |
| ... | ... | ... | ... | ... | ... | ... | ... | ... |

SELECT PARAMETER USED FOR ANALYSIS  L2

| | RECOGNITION PARAMETER | | ANALYSIS PARAMETER | | EVALU-ATION |
|---|---|---|---|---|---|
| ☐ | Spheroid | — | Total Inensity | — | 90/100 |
| ☐ | Spheroid | Nuclear | Total Inensity | — | 95/100 |
| ☐ | Spheroid | Nuclear | X | Y | 80/300 |
| ☐ | Spheroid | Nuclear | Count | — | 85/100 |

ENTER    CANCEL

SELECT PARAMETER USED FOR ANALYSIS  L3

| | RECOGNITION PARAMETER | | ANALYSIS PARAMETER | | EVALU-ATION |
|---|---|---|---|---|---|
| ☐ | Spheroid | Nuclear | Total Inensity | — | 95/100 |
| ☐ | Spheroid | — | Total Inensity | — | 90/100 |
| ☐ | Spheroid | Nuclear | Count | — | 85/300 |
| ☐ | Spheroid | Nuclear | X | Y | 80/100 |

ENTER    CANCEL

SELECT PURPOSE OF ANALYSIS  L4

| | PURPOSE OF ANALYSIS |
|---|---|
| ☐ | LUMINANCE ANALYSIS OF Spheroid |
| ☐ | LUMINANCE ANALYSIS OF NUCLEUS |
| ☐ | DISTRIBUTION ANALYSIS OF NUCLEUS |
| ☐ | NUMBER COUNT OF NUCLEUS |

ENTER    CANCEL

SELECT PURPOSE OF ANALYSIS  L5

| | PURPOSE OF ANALYSIS | EVALU-ATION |
|---|---|---|
| ☐ | LUMINANCE ANALYSIS OF Spheroid | 90/100 |
| ☐ | LUMINANCE ANALYSIS OF NUCLEUS | 95/100 |
| ☐ | DISTRIBUTION ANALYSIS OF NUCLEUS | 80/300 |
| ☐ | NUMBER COUNT OF NUCLEUS | 85/100 |

ENTER    CANCEL

SELECT PARAMETER USED FOR ANALYSIS     L6

| | RECOGNITION PARAMETER | | ANALYSIS PARAMETER | | PURPOSE OF ANALYSIS |
|---|---|---|---|---|---|
| ☐ | Spheroid | — | Total Inensity | — | LUMINANCE ANALYSIS OF Spheroid |
| ☐ | Spheroid | Nuclear | Total Inensity | — | LUMINANCE ANALYSIS OF NUCLEUS |
| ☐ | Spheroid | Nuclear | X | Y | DISTRIBUTION ANALYSIS OF NUCLEUS |
| ☐ | Spheroid | Nuclear | Count | — | NUMBER COUNT OF NUCLEUS |

( ENTER )   ( CANCEL )

SELECT PARAMETER USED FOR ANALYSIS     L7

| | RECOGNITION PARAMETER | | ANALYSIS PARAMETER | | PURPOSE OF ANALYSIS | EVALU-ATION |
|---|---|---|---|---|---|---|
| ☐ | Spheroid | — | Total Inensity | — | LUMINANCE ANALYSIS OF Spheroid | 95/100 |
| ☐ | Spheroid | Nuclear | Total Inensity | — | LUMINANCE ANALYSIS OF NUCLEUS | 90/100 |
| ☐ | Spheroid | Nuclear | X | Y | DISTRIBUTION ANALYSIS OF NUCLEUS | 85/300 |
| ☐ | Spheroid | Nuclear | Count | — | NUMBER COUNT OF NUCLEUS | 80/100 |

( ENTER )   ( CANCEL )

FIG. 14

APPARATUS, SYSTEM, AND METHOD FOR SUPPORTING SETTING FOR CELL IMAGE ANALYSIS

CROSS REFERENCE TO RELATED APPLICATIONS

This application is based upon and claims the benefit of priority from prior Japanese Patent Application No. 2021-064247, filed Apr. 5, 2021, the entire contents of which are incorporated herein by this reference.

TECHNICAL FIELD

The present disclosure relates to an apparatus, a system, and a method for supporting setting for cell image analysis.

BACKGROUND

There is known an apparatus that visually recognizes an object appearing in an image acquired by a microscope or the like and analyzes the object with designated parameters. In general, such an apparatus can perform various kinds of analysis by setting a recognition parameter that specifies an object of recognition and an analysis parameter that specifies what feature of the object of recognition should be focused on in performing analysis. Meanwhile, due to too much flexibility in setting, a user who does not have sufficient expertise suffers from a problem of difficulty in obtaining useful analysis results.

A technique associated with such a problem is described in WO 2018/109826 A, for example. According to the technique described in WO 2018/109826 A, a user can obtain information on a correlation between parameters used for analysis, from image information.

SUMMARY

An apparatus according to one aspect of the present invention is an apparatus that supports setting for cell image analysis, and includes: a processor configured to select parameter-setting candidate information for image analysis that analyzes a cell image, by referring to a database about a parameter-setting history of the image analysis; and an output unit configured to output the parameter-setting candidate information selected by the processor. The database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis. The processor is configured to, in response to selection of a first parameter as the recognition parameter, select the parameter-setting candidate information based on combination information including the first parameter in the setting history information.

A system according to one aspect of the present invention is a system that supports setting for cell image analysis, and includes: a storage unit in which a database about a parameter-setting history of image analysis that analyzes a cell image is stored; a processor configured to select parameter-setting candidate information for the image analysis by referring to the database; and a display unit configured to display the parameter-setting candidate information selected by the processor. The database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis. The processor is configured to, in response to selection of a first parameter as the recognition parameter, select the parameter-setting candidate information based on combination information including the first parameter in the setting history information.

A method according to one aspect of the present invention is a method of supporting setting for cell image analysis, and includes: selecting parameter-setting candidate information for image analysis that analyzes a cell image, by referring to a database about a parameter-setting history of the image analysis; and outputting the selected parameter-setting candidate information. The database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis. The selecting the parameter-setting candidate information includes, in response to selection of a first parameter as the recognition parameter, selecting the parameter-setting candidate information based on combination information including the first parameter in the setting history information.

BRIEF DESCRIPTION OF DRAWINGS

The present invention will be more apparent from the following detailed description when the accompanying drawings are referenced.

FIG. 3 is a view illustrating a structure of a database;

FIG. 9 is a view illustrating a different example of list display of selection results;

FIG. 10 is a view illustrating another different example of list display of selection results;

FIG. 11 is a view illustrating still another different example of list display of selection results;

FIG. 12 is a view illustrating still another different example of list display of selection results;

FIG. 13 is a view illustrating still another different example of list display of selection results;

FIG. 14 is a view illustrating still another different example of list display of selection results;

DESCRIPTION

It is common that the above-described analysis apparatus is shared by a plurality of users. To take advantage of such actual usage circumstances, there arises a demand for a technique that allows a plurality of users sharing an analysis apparatus to share not only the analysis apparatus, but also knowledge about analysis setting.

In view of the above-described situation, embodiments of the present invention will be described below.

First Embodiment

Figure 1:
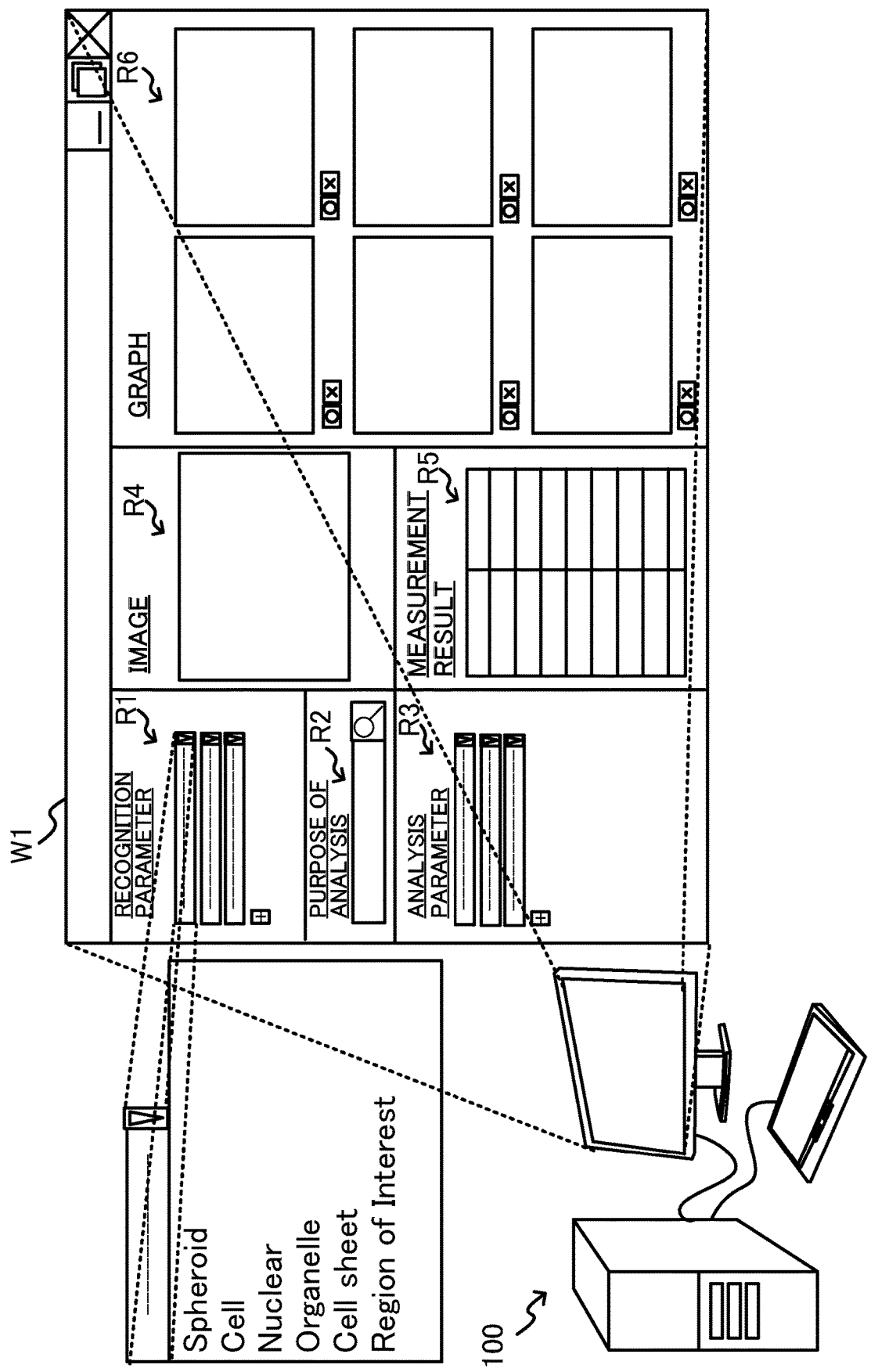
FIG. 1 is a view for explaining an apparatus according to a first embodiment.

FIG. 1 is a view for explaining an apparatus 100 according to the present embodiment. The apparatus 100 is an apparatus that analyzes a cell image, and is an apparatus 100 that supports setting for analysis that analyzes a cell image (hereinafter referred to as cell image analysis). A cell image is simply required to show a cell, in other words, include a cell. A cell image may be an image including a cell clump such as a spheroid or an organoid, for example, or may be an image in which a part of cells is displayed while being enlarged.

When the apparatus 100 executes an analysis program, a window W1 for analysis as illustrated in FIG. 1, for example, is displayed on a display device. A user can provide setting for cell image analysis by designating a parameter for the cell image analysis using setting areas (an area R1, an area R2, and an area R3) in the window W1. Further, when the apparatus 100 performs analysis after the setting is provided, the cell image displayed in an area R4 is analyzed, and a measurement result and an analysis result are displayed in an area R5 and an area R6.

The kinds of parameters for cell image analysis that can be designated by a user in the apparatus 100 include at least two kinds of a recognition parameter that specifies an object of recognition, and an analysis parameter that specifies what feature of an object of recognition should be focused on in performing analysis. A recognition parameter and an analysis parameter can be designated in the area R1 and the area R3, and one or more recognition parameters and one or more analysis parameters can be designated.

Examples of a parameter selectable as a recognition parameter include a cell clump such as a "spheroid" or an "organoid", a "cell", a "cell nucleus", an "organelle", a "cell sheet", and the like. Alternatively, a specific kind of cell, that is, a "cell kind" may be selectable. Further, a "region of interest" that is a region having any specific feature designated in advance by a user, an intracellular structure having any specific feature specified in advance by a user, called a "characteristic structure", and the like may be selectable. However, the above-described parameters are mere examples, and other parameters may be settable as recognition parameters.

It may be possible to designate whether an object specified with a recognition parameter is recognized and analyzed in two dimensions (2D) or in three dimensions (3D). Further, with regard to parameters in a parent-child relationship ("spheroid"-"cell", "spheroid"-"cell nucleus", and the like, for example), the parent-child relationship may be designated and set. By setting a parent-child relationship, it is possible to compile child information for each parent.

Parameters selectable as analysis parameters include various parameters classified into intensity information, form information, and system information, for example. Parameters classified as intensity information include total intensity, average intensity, maximum intensity, minimum intensity, standard deviation (SD) of intensity, and the like. In addition, absorbance, transmittance, reflectance, and the like may also be classified as parameters of intensity information. Parameters classified as form information include an area, a boundary, a surface area, a volume, circularity, sphericity, a major axis, a minor axis, and the like, for example. In addition, the number, color, lightness, saturation, and the like may also be classified as parameters of form information. Parameters classified as system information include a container, a position (X, Y, Z), time, a center of gravity (X, Y, Z), and the like, for example. However, the above-described parameters are mere examples, and other parameters may be settable as analysis parameters.

The apparatus 100 according to the present embodiment presents information indicating candidates for parameter setting for cell image analysis (hereinafter referred to as parameter-setting candidate information), to a user when the user specifies a part of parameter-setting and/or inputs a keyword concerning analysis. More specifically, the apparatus 100 presents parameter-setting candidate information to the user by referring to a database 200 (see FIG. 2) about a parameter-setting history of image analysis that analyzes a cell image, based on the user's specification and/or input. As a result, the user can set a parameter for cell image analysis only by selecting parameter setting used for analysis from the parameter-setting candidate information being presented. Therefore, even a user who does not have expertise can easily perform analysis with appropriate setting.

Additionally, instead of presenting parameter-setting candidate information itself to a user, the apparatus 100 may present another information (purpose-of-analysis information described later, for example) for selecting parameter setting indicated by the parameter-setting candidate information.

Figure 2:
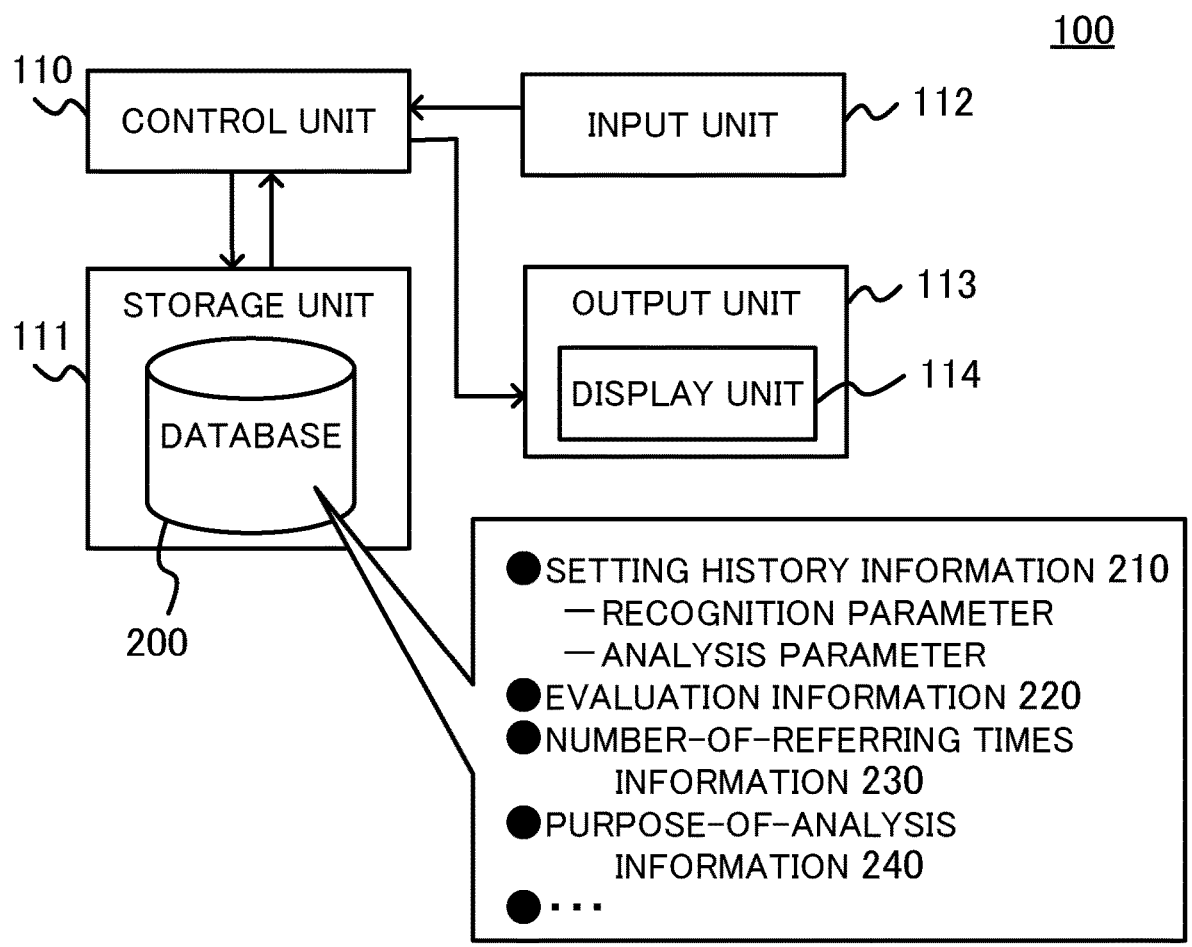
FIG. 2 is a view illustrating a functional configuration of the apparatus according to the first embodiment.

FIG. 2 is a view illustrating a functional configuration of the apparatus 100 according to the present embodiment. FIG. 3 is a view illustrating a structure of the database 200. Below, the configuration of the apparatus 100 will be described in more details with reference to FIGS. 2 and 3.

As illustrated in FIG. 2, the apparatus 100 includes a control unit 110, a storage unit 111, an input unit 112, and an output unit 113. The output unit 113 includes a display unit 114. The apparatus 100 may further include other functional units.

The control unit 110 will be described later. The storage unit 111 stores therein the database 200. For example, as illustrated in FIGS. 2 and 3, the database 200 includes setting history information 210, evaluation information 220, number-of-referring times information 230, and purpose-of-analysis information 240, and may further include other information.

The setting history information 210 included in the database 200 is a collection of pieces of combination information indicating combinations of parameters having been set in previously-performed cell image analysis. Specifically, as illustrated in FIGS. 2 and 3, the setting history information 210 is a collection of pieces of combination information indicating combinations of a recognition parameter and an analysis parameter such as the above-described parameters. As illustrated in FIG. 3, the setting history information 210 may include a plurality of recognition parameters and a plurality of analysis parameters in each combination (each record in FIG. 3). A plurality of recognition parameters included in each combination may include a plurality of recognition parameters in parent-child relationships (Spheroid and Nuclear, for example), and may further include information about a dimension (three dimensions, for example). Further, a plurality of analysis parameters may include analysis parameters respectively corresponding to a plurality of axes in graph representation of analysis result. Additionally, FIG. 3 illustrates an example in which analysis parameters respectively corresponding to an X axis and a Y axis in two-dimensional display are included.

The evaluation information 220 included in the database 200 is a collection of pieces of individual evaluation information indicating evaluation results for the pieces of combination information. Specifically, the individual evaluation information may include first evaluation information about the number of evaluations each yielding a specific evaluation result among evaluations of corresponding combination information and second evaluation information about the number of evaluations of the corresponding combination information, for example. For example, as illustrated in FIG. 3, the individual evaluation information may include a value of the number of evaluations each yielding a favorable evaluation result as the first evaluation information and may include a value of the number of all evaluations irrespective of their evaluation results, as the second evaluation information. Additionally, in the example of FIG. 3, in the "EVALUATION" column, the numerators indicate the first evaluation information and the denominators indicate the second evaluation information. In the above-described example, the individual evaluation information includes the number of evaluations each yielding a favorable evaluation result and the total number of evaluations. However, evaluation of combination information is not limited to binary evaluation yielding only a favorable result and an unfavorable result. For example, combination information may be evaluated in three or more levels of "A", "B", "C", "D", and the like with respect to a predetermined reference. In that case, the numbers of evaluations respectively yielding the three or more levels of results may be included in the individual evaluation information. In other words, the individual evaluation information may include plural pieces of the first evaluation information, and the plural pieces of the first evaluation information may be respective pieces of information about the numbers of evaluations yielding different specific results for their corresponding pieces of combination information (for example, the number of evaluations yielding a result "A", the number of evaluations yielding a result "B", the number of evaluations yielding a result "C", the number of evaluations yielding a result "D", and the like). Further, the individual evaluation information may include third evaluation information about a comprehensive evaluation result based on the plural pieces of individual evaluation information (that is, the numbers of evaluations respectively yielding three or more levels of results). Thus, the individual evaluation information may include the second evaluation information and one or more pieces of the first evaluation information. Further, the individual evaluation information may include the second evaluation information, the third evaluation information, and one or more pieces of first evaluation information. Moreover, the individual evaluation information may include the third evaluation information and one or more pieces of the first evaluation information. In other words, the individual evaluation information is simply required to include at least one of one or more pieces of the first evaluation information, the second evaluation information, and the third evaluation information.

The number-of-referring times information 230 included in the database 200 is a collection of pieces of individual number-of-referring times information indicating the numbers of times of referring to the pieces of combination information. The number of referring times is the number of times that combination information is selected as parameter-setting candidate information by the control unit 110 and a combination of parameters indicated by the combination information is selected as parameter setting used for analysis by a user. Alternatively, the number of referring times may be the number of times that combination information is selected as parameter-setting candidate information, a combination of parameters indicated by the combination information is selected as parameter setting used for analysis, and then analysis is actually performed with the selected parameter setting.

The purpose-of-analysis information 240 included in the database 200 is a collection of pieces of individual purpose-of-analysis information indicating purposes of image analysis using the pieces of combination information. Specifically, the individual purpose-of-analysis information is text information that means analysis of a feature specified by an analysis parameter for a recognition target designated by a recognition parameter, for example.

The input unit 112 accepts a user's operation. A user's operation is an operation of designating a recognition parameter, performed on the area R1 of the window W1, for example. Alternatively, a user's operation may be an operation of inputting a search keyword corresponding to a purpose of analysis, performed on the area R2 of the window W1. In addition, the area R2 of the window W1 is not limited to the configuration in which free text is input, and may be configured to allow designation of a purpose of analysis from information listed in advance, like the area R1 or the area R3. Thus, a user's operation may be an operation of designating a purpose of analysis, performed on the area R2 of the window W1. Moreover, a user's operation may be an operation of designating an analysis parameter, performed on the area R3 of the window W1, for example.

The control unit 110 selects parameter-setting candidate information for image analysis by referring to the above-described database 200. Specifically, in response to selection of a given parameter (hereinafter referred to as a first parameter), as a recognition parameter, the control unit 110 selects parameter-setting candidate information based on combination information including the first parameter in the setting history information 210. More specifically, in response to selection of the first parameter, the control unit 110 selects parameter-setting candidate information from combination information including the first parameter included in the setting history information 210, based on the evaluation information 220. The control unit 110 may select only combination information whose corresponding evaluation result is more favorable than a predetermined reference, from the combination information including the first parameter, for example. Additionally, at that time, the selection of the first parameter may be achieved when a user's operation of designating a recognition parameter is accepted by the input unit 112, for example.

The output unit 113 outputs selection candidate information including the parameter-setting candidate information selected by the control unit 110. The output unit 113 may output selection candidate information including the purpose-of-analysis information corresponding to the parameter-setting candidate information, instead of the selection candidate information including the parameter-setting candidate information selected by the control unit 110. In other words, the output unit 113 is simply required to output selection candidate information including at least one of the parameter-setting candidate information selected by the control unit 110 and the purpose-of-analysis information corresponding to the parameter-setting candidate information selected by the control unit 110.

The display unit 114 displays the selection candidate information output by the output unit 113. In a case where the selection candidate information displayed on the display unit 114 includes parameter-setting candidate information, a user can select parameter setting used for analysis, from the parameter-setting candidate information being displayed. On the other hand, in a case where the selection candidate information displayed on the display unit 114 includes purpose-of-analysis information, a user can select a purpose of analysis indicating information that the user desires to know through analysis, thereby indirectly selecting parameter setting corresponding to the purpose of analysis, instead of directly selecting parameter setting itself.

In the apparatus 100, information presented to a user is identified based on the evaluation information 220, that is, an evaluation result obtained through analysis having been performed in the past. Thus, only a limited number of options evaluated relatively highly are presented to a user. Therefore, the user can efficiently set a parameter that can provide a useful analysis result, only by selecting one from limited options. In particular, the apparatus 100 is very useful in enabling efficient setting of analysis parameters that are difficult to appropriately select as compared to recognition parameters. Further, since setting can be achieved only by selection from given options, there are few setting errors, and it is possible to avoid useless work such as redoing analysis upon finding of the setting errors after analysis.

Figure 4:
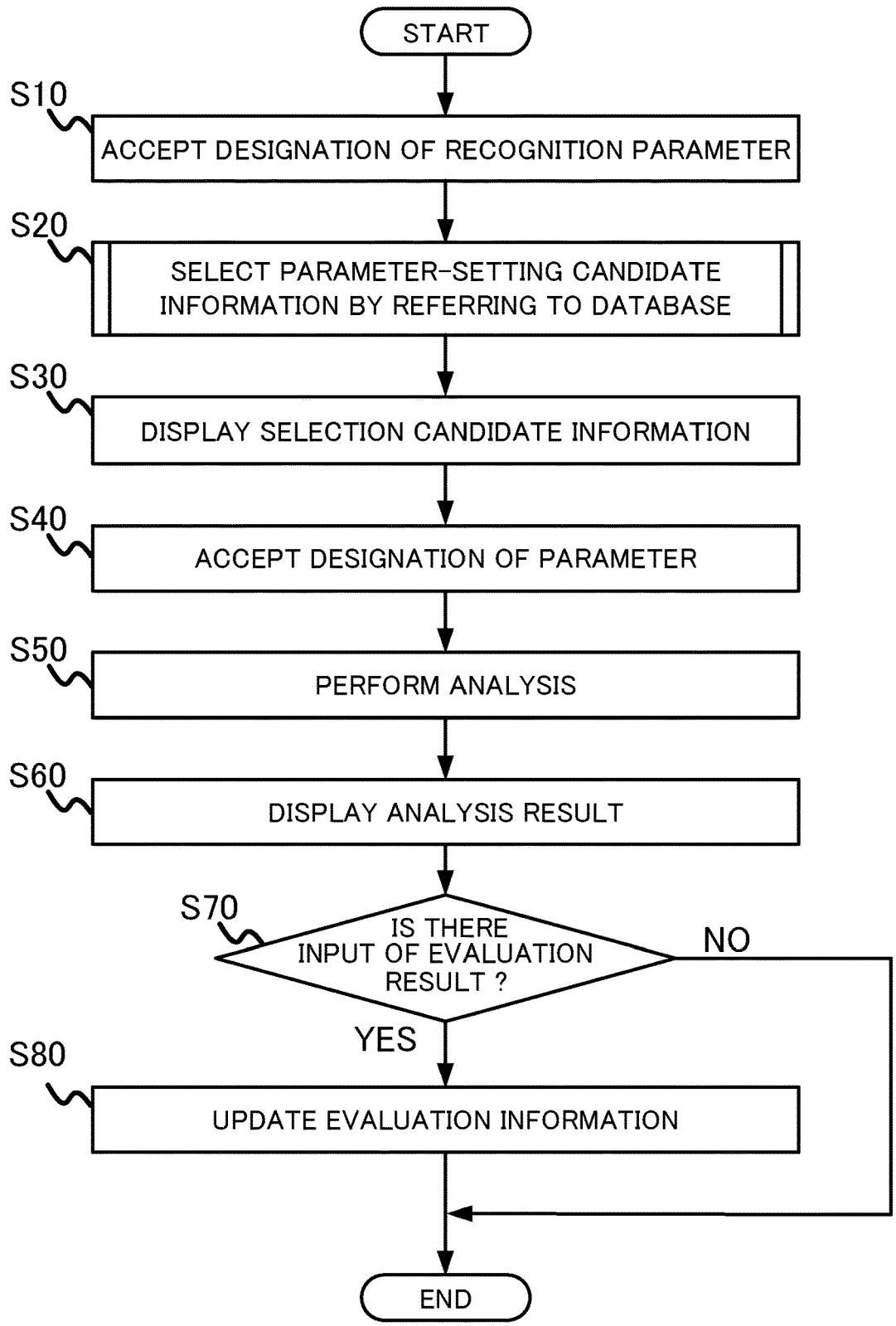
FIG. 4 is a view illustrating an example of a flowchart of a process performed by the apparatus.
Figure 5:
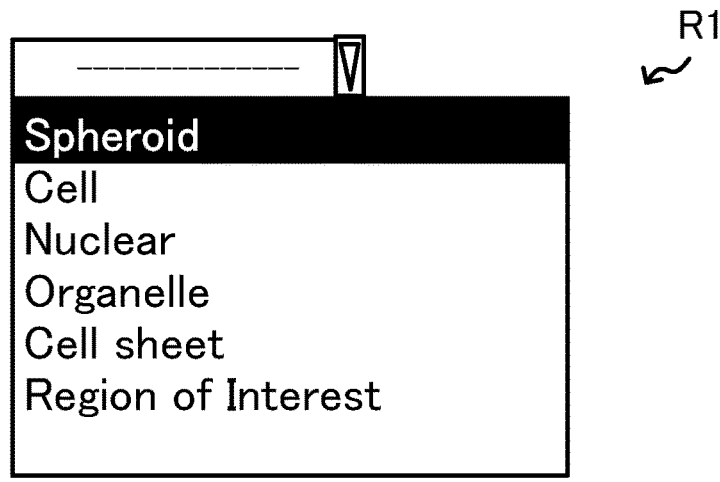
FIG. 5 is a view for explaining a method of designating a recognition parameter.
Figure 6:
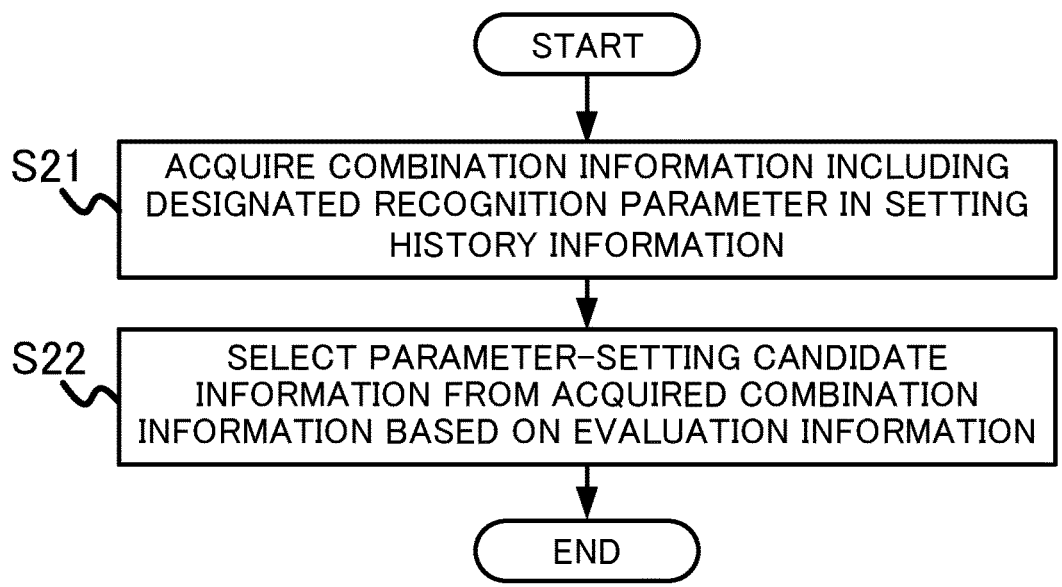
FIG. 6 is a view illustrating an example of a flowchart of a selecting process performed by the apparatus.
Figure 7:
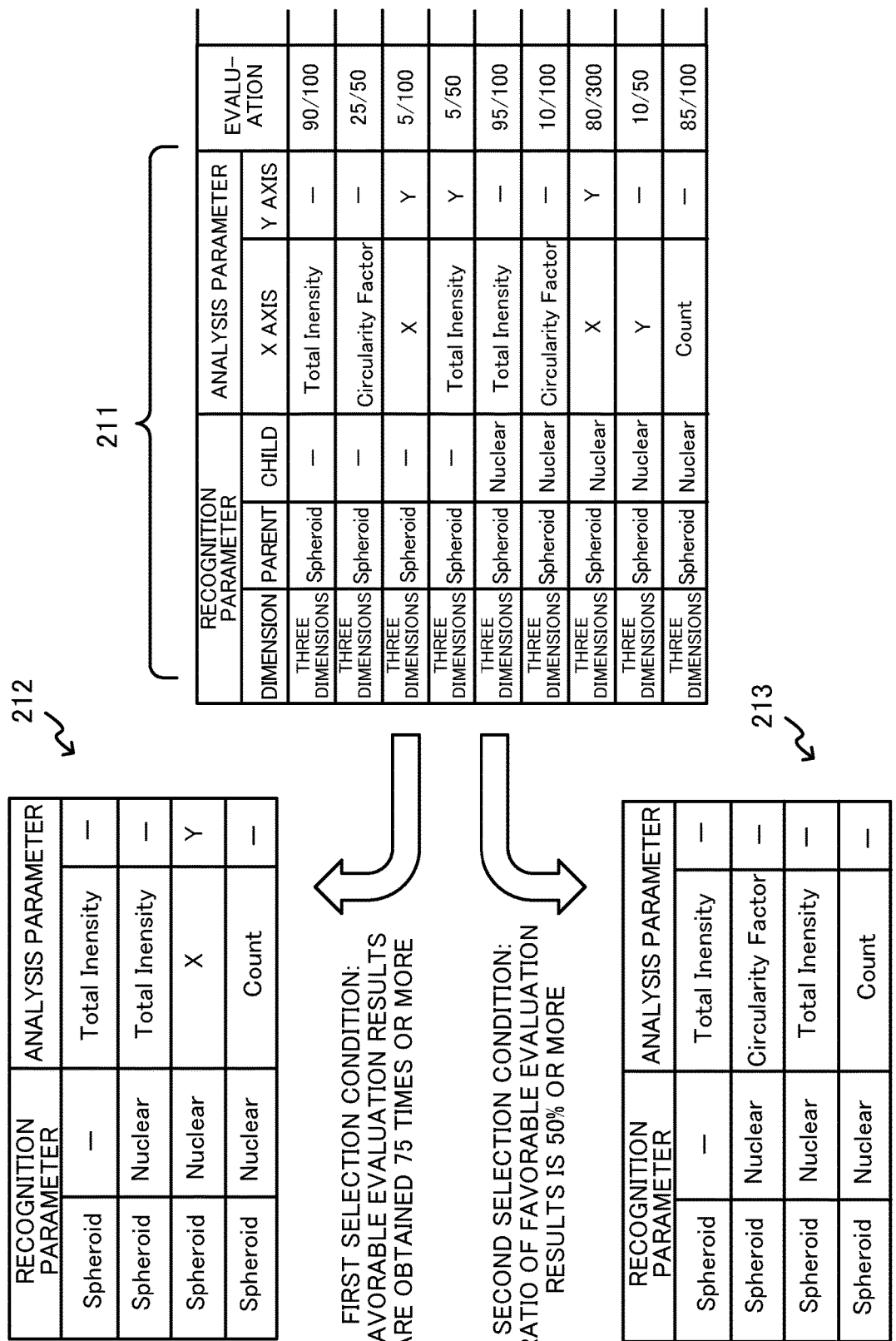
FIG. 7 is a view for explaining a difference in selection result depending on a selection condition.
Figure 8:
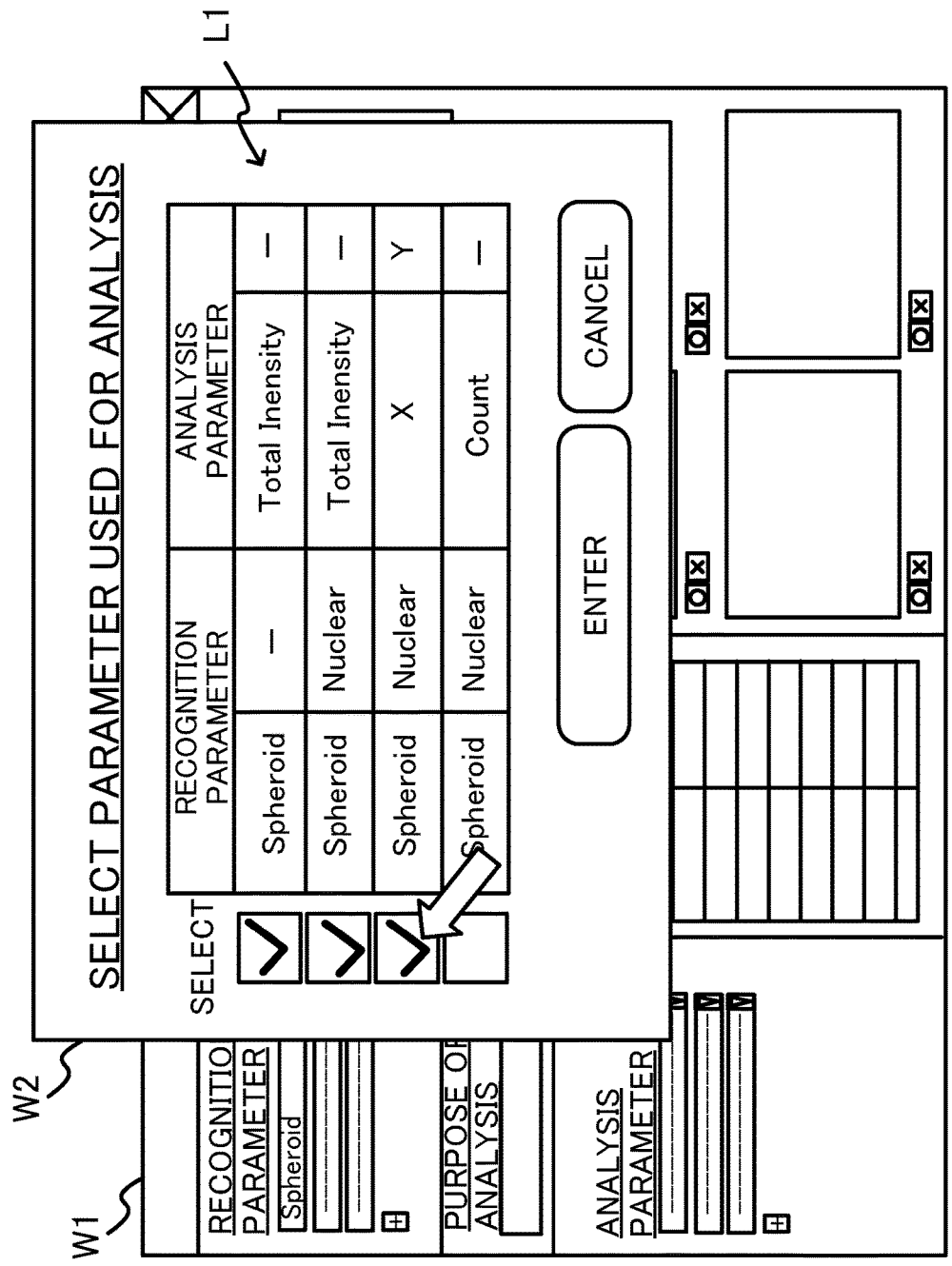
FIG. 8 is a view illustrating an example of list display of selection results.
Figure 15:
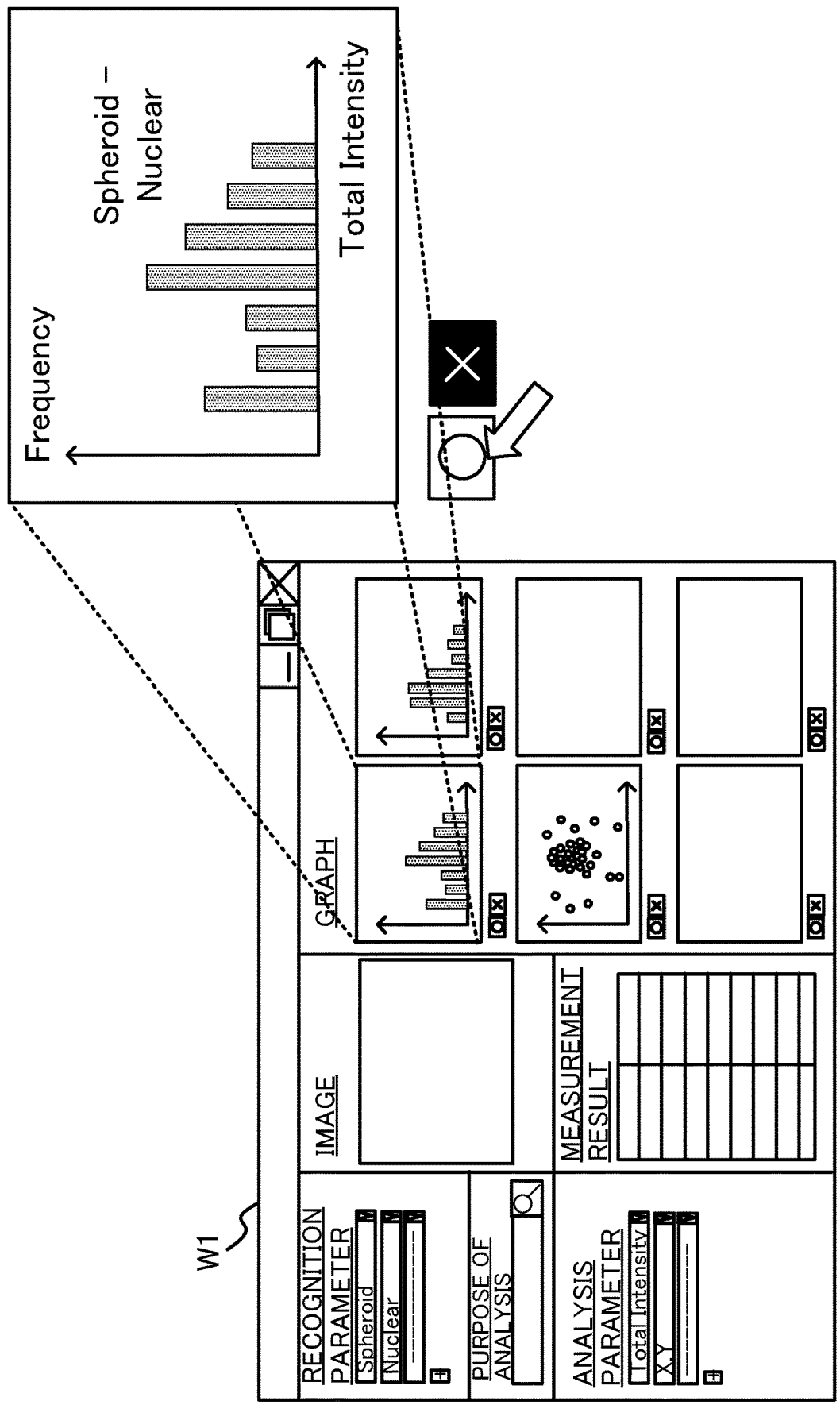
FIG. 15 is a view for explaining a method of evaluating an analysis result.

FIG. 4 is a view illustrating an example of a flowchart of a process performed by the apparatus 100. FIG. 5 is a view for explaining a method of designating a recognition parameter. FIG. 6 is a view illustrating an example of a flowchart of a selecting process performed by the apparatus 100. FIG. 7 is a view for explaining a difference in selection result depending on a selection condition. FIG. 8 is a view illustrating an example of list display of selection results. FIG. 9 is a view illustrating a different example of list display of selection results. FIG. 10 is a view illustrating another different example of list display of selection results. FIG. 11 is a view illustrating still another different example of list display of selection results. FIG. 12 is a view illustrating still another different example of list display of selection results. FIG. 13 is a view illustrating still another different example of list display of selection results. FIG. 14 is a view illustrating still another different example of list display of selection results. FIG. 15 is a view for explaining a method of evaluating an analysis result. Below, with reference to FIGS. 4 to 15, processes performed by the apparatus 100 will be specifically described.

When the control unit 110 of the apparatus 100 executes a program to start the process illustrated in FIG. 4 and the display unit 114 displays the window W1 illustrated in FIG. 1, first, the apparatus 100 accepts designation of a recognition parameter (step S10). In the step S10, when a user operates a UI control in the area R1 to designate a recognition parameter as illustrated in FIG. 5, the input unit 112 accepts the designation of the recognition parameter. Below, description will be made about a case where the user selects "Spheroid" as the recognition parameter, by way of example.

When accepting the designation of the recognition parameter, the apparatus 100 performs the selecting process illustrated in FIG. 6 of selecting parameter-setting candidate information by referring to the database 200 (step S20). In the selecting process, first, the control unit 110 acquires combination information including the recognition parameter designated in the step S10 in the setting history information 210 in the database 200 (step S21). As a result, for example, as illustrated in FIG. 7, all pieces of the combination information 211 each including "Spheroid" as a recognition parameter are acquired from the setting history information 210.

Thereafter, the control unit 110 selects parameter-setting candidate information based on the evaluation information 220 from the combination information acquired in the step S21 (step S22). In the step S22, combination information satisfying a predetermined condition (hereinafter referred to as a selection condition) is selected as parameter-setting candidate information. For example, the selection may be performed using a selection condition that the number of times of obtaining favorable evaluation results is 75 or more. In this case, as illustrated in FIG. 7, the control unit 110 may select combination information 212 including the number of times of obtaining favorable evaluation results of 75 or more, as the parameter-setting candidate information. Alternatively, the selection may be performed using a selection condition that the ratio of favorable evaluation results is 50% or more, for example. In this case, as illustrated in FIG. 7, the control unit 110 may select combination information 213 including the ratio of favorable evaluation results of 50% or more, as the parameter-setting candidate information. The selection condition may be settable by the user, and for example, may be designatable by the user among some options prepared in advance. Furthermore, in a case where the evaluation information includes the third evaluation information that is a comprehensive evaluation result, the control unit 110 may select parameter-setting candidate information based on the third evaluation information.

When the parameter-setting candidate information is selected and the selecting process ends, the apparatus 100 displays selection candidate information (step S30). At that time, for example, the output unit 113 outputs the parameter-setting candidate information selected in the step S20 as the selection candidate information, and the display unit 114 displays the selection candidate information as illustrated in FIG. 8. A list L1 in the window W2 illustrated in FIG. 8 indicates the parameter-setting candidate information selected in the step S20. As a result, the user can set a parameter that can promise to provide a useful analysis result, only by selecting a given combination from the combinations of parameters being displayed.

Additionally, though FIG. 8 illustrates the example in which only the parameter-setting candidate information acquired from the setting history information 210 is displayed, the parameter-setting candidate information may be displayed together with the evaluation information corresponding to the parameter-setting candidate information as illustrated in FIG. 9. A list L2 in the window W2 illustrated in FIG. 9 is a list in which the parameter-setting candidate information selected in the step S20 and the evaluation information corresponding to the parameter-setting candidate information are arranged. Thus, in the step S30, the output unit 113 may output the selection candidate information that is the parameter-setting candidate information selected in the step S20 and in addition, the evaluation information corresponding to the selection candidate information, and the display unit 114 may display the selection candidate information together with the evaluation information corresponding to the selection candidate information. As a result, the user can determine a combination used for analysis from the combinations of parameters being displayed, by referring to the evaluation information. In particular, the display unit 114 displays evaluation results with the number of times or a ratio using the first evaluation information and the second evaluation information, so that the user can grasp the details of evaluation results. Further, in the case where the individual evaluation information includes the third evaluation information that is a comprehensive evaluation result as described above, the display unit 114 may display the third evaluation information. Displaying the third evaluation information makes it possible to grasp whether an evaluation result is favorable or unfavorable at a glance, as compared with the case of displaying the number of times and a ratio. Additionally, the display unit 114 may display all of the first evaluation information, the second evaluation information, and the third evaluation information.

Additionally, though FIG. 8 illustrates the example in which the parameter-setting candidate information acquired from the setting history information 210 is displayed as it is, the parameter-setting candidate information may be displayed in a display order determined based on the evaluation information corresponding to the parameter-setting candidate information as illustrated in FIG. 10. A list L3 in the window W2 illustrated in FIG. 10 is a list in which the pieces of parameter-setting candidate information selected in the step S20 are arranged on a descending order of the number of evaluations yielding favorable evaluation results. Thus, in the step S30, the output unit 113 may rearrange the pieces of selection candidate information that are the pieces of parameter-setting candidate information selected in the step S20, in a display order determined based on their corresponding to pieces of evaluation information, and the display unit 114 may display the pieces of selection candidate information in the determined display order. As a result, also in a case where there are many combinations of parameters in the selection candidate information, the user can consider use of a combination of highly-evaluated parameters preferentially.

Additionally, though FIG. 8 illustrates the example in which the parameter-setting candidate information acquired from the setting history information 210 is displayed, instead of the parameter-setting candidate information, its corresponding purpose-of-analysis information may be displayed as illustrated in FIG. 11. A list L4 in the window W2 illustrated in FIG. 11 indicates the purpose-of-analysis information corresponding to the parameter-setting candidate information selected in the step S20. Thus, in the step S30, the output unit 113 may output the purpose-of-analysis information corresponding to the parameter-setting candidate information selected in the step S20, as the selection candidate information, and the display unit 114 may display the selection candidate information that is the purpose-of-analysis information. Also in this case, the user is simply required to select a given purpose of analysis from the purposes of analysis being displayed, to set a parameter that corresponds to the purpose of analysis and can promise to provide a useful analysis result.

In addition, the parameter-setting candidate information, the purpose-of-analysis information corresponding to the parameter-setting candidate information, and the evaluation information corresponding to the parameter-setting candidate information described above may be displayed while being appropriately combined. A list L5 in the window W2 illustrated in FIG. 12 is a list in which the purpose-of-analysis information corresponding to the parameter-setting candidate information selected in the step S20 and the evaluation information corresponding to the parameter-setting candidate information selected in step S20 are arranged. A list L6 in the window W2 illustrated in FIG. 13 is a list in which the parameter-setting candidate information selected in the step S20 and the purpose-of-analysis information corresponding to the parameter-setting candidate information selected in the step S20 are arranged. A list L7 in the window W2 illustrated in FIG. 14 is a list in which the parameter-setting candidate information selected in the step S20, the purpose-of-analysis information corresponding to the parameter-setting candidate information selected in the step S20, and the evaluation information corresponding to the parameter-setting candidate information selected in the step S20 are arranged.

When the selection candidate information is displayed, the apparatus 100 then accepts the user's direct or indirect designation of a parameter (step S40), and analyzes a cell image (step S50). In this embodiment, the control unit 110 sets the parameter that is designated by the user and is accepted by the input unit 112 as a parameter for cell image analysis, and then analyzes the cell image.

When the analysis ends, the apparatus 100 displays an analysis result (step S60). In this embodiment, the display unit 114 displays an analysis result in graph form in the area R5 in the window W1 as illustrated in FIG. 15, for example. The form of a graph is not limited to any particular form. However, in a case where one analysis parameter is provided, for example, a histogram for the one analysis parameter may be displayed. Alternatively, in a case where two or three analysis parameters are provided, a scatter diagram showing a distribution of the two or three analysis parameters in a two-dimensional or three-dimensional space may be displayed.

When the analysis result is displayed, the apparatus 100 monitors an input for evaluating the combination of the parameters having been used for the analysis (step S70). Then, when an input is detected (YES in step S70), the evaluation information corresponding to the input in the database 200 is updated (step S80). Additionally, the user may input an evaluation result using the UI control provided in the vicinity of the analysis result as illustrated in FIG. 15, and the control unit 110 may update the database 200 in response to the operation performed on the UI control. Thus, the control unit 110 may control update of the database 200 based on a new evaluation result provided after given image analysis that analyzes a cell image (hereinafter referred to as first image analysis). Additionally, the new evaluation result is a newly-provided result of evaluation of combination information indicating the combination of parameters set in the first image analysis. The apparatus 100, which has a selecting function of selecting candidates that are to be presented to the user and an evaluating function of evaluating a selection result, can improve its selecting function using an evaluation result. Therefore, the more the apparatus 100 is used, the more its selecting function is improved, so that use of the apparatus 100 is further promoted.

Figure 16:
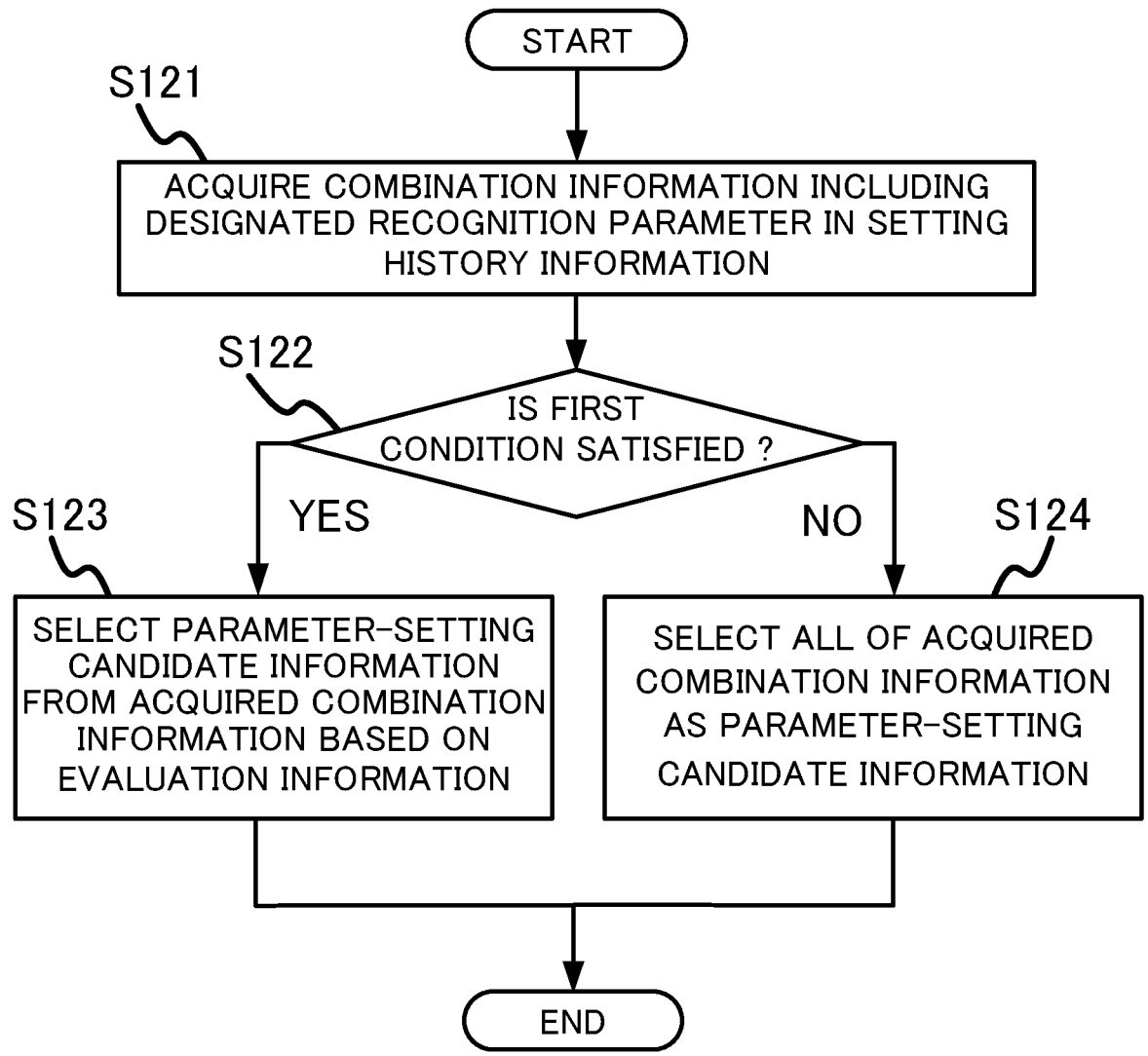
FIG. 16 is a view illustrating a different example of the flowchart of the selecting process performed by the apparatus.
Figure 17:
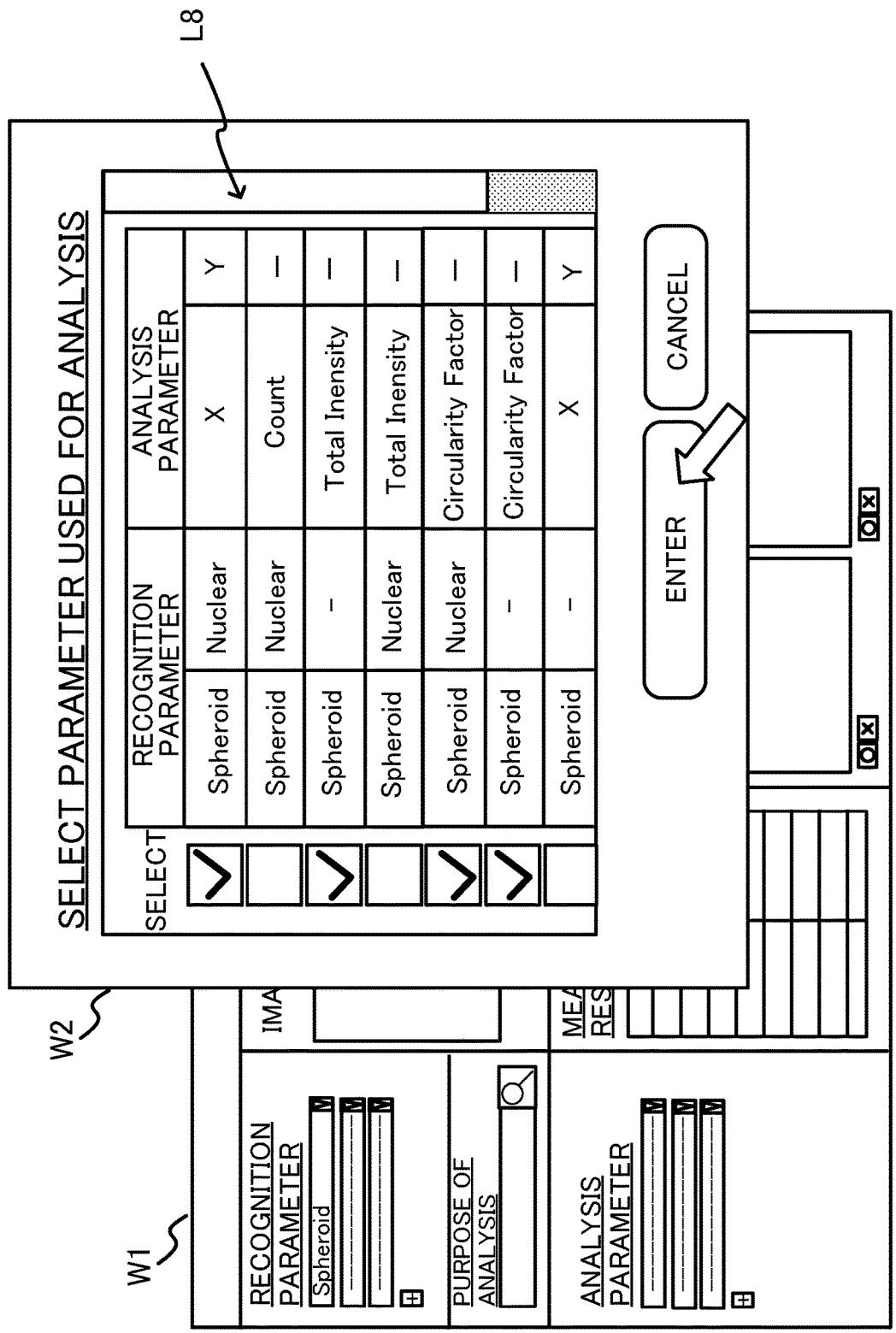
FIG. 17 is a view illustrating still another different example of list display of selection results.

FIG. 16 is a view illustrating a different example of the flowchart of the selecting process (step S20) performed by the apparatus 100. FIG. 17 is a view illustrating still another different example of list display of selection results. A modification of the selecting process performed by the apparatus 100 will be described with reference to FIGS. 16 and 17.

In the selecting process illustrated in FIG. 16, upon selection of a recognition parameter, first, the apparatus 100 acquires combination information including the recognition parameter designated in the step S10 in FIG. 4 in the setting history information 210 in the database 200 (step S121). This step is similar to the step S21 illustrated in FIG. 6.

Thereafter, the control unit 110 of the apparatus 100 determines whether a predetermined condition (first condition) is satisfied (step S122). The first condition may be any condition under which selection of parameter-setting candidate information based on the evaluation information can be regarded as appropriate. Examples of such condition includes a condition that a sufficient amount of evaluation information is accumulated in the database 200, for example.

When the control unit 110 determines that the first condition is satisfied (YES in step S122), the control unit 110 selects parameter-setting candidate information based on the evaluation information 220 from the combination information acquired in the step S121 (step S123). This step is similar to the step S21 illustrated in FIG. 6.

On the other hand, when the control unit 110 determines that the first condition is not satisfied (NO in step S122), the control unit 110 selects all pieces of the combination information acquired in the step S121, as parameter-setting candidate information (step S124).

Not the selecting process illustrated in FIG. 6, but the selecting process illustrated in FIG. 16 is performed, so that narrowing based on the evaluation information is not performed in a period before the evaluation information is sufficiently accumulated, such as a period immediately after the start of operation of the apparatus 100. Instead, as illustrated in FIG. 17, a list L8 including all of the parameter setting having been provided in the past, including the designated parameter, is displayed in the window W2. Therefore, while supporting of setting using history information is performed from the beginning of the operation of the apparatus 100, the effectiveness in supporting setting can increase as the operation progresses. Additionally, the pieces of parameter-setting candidate information displayed in the list L8 may be displayed in a display order determined based on the pieces of number-of-referring times information corresponding to the pieces parameter-setting candidate information, and may be displayed in a descending order of the number of referring times, for example.

Moreover, FIG. 16 illustrates the example in which all the pieces of acquired combination information are always selected as parameter-setting candidate information when the first condition is not satisfied. However, when the first condition is not satisfied but another condition (second condition) is satisfied, all the pieces of acquired combination information may be selected as parameter-setting candidate information. The second condition may be that there are a predetermined number or more of pieces of acquired combination information, for example. As a result, in a case where not only the evaluation information but also the setting history information 210 is not sufficiently accumulated and the minimum necessary options cannot be presented to the user, it is possible to give up using history information.

Figure 18:
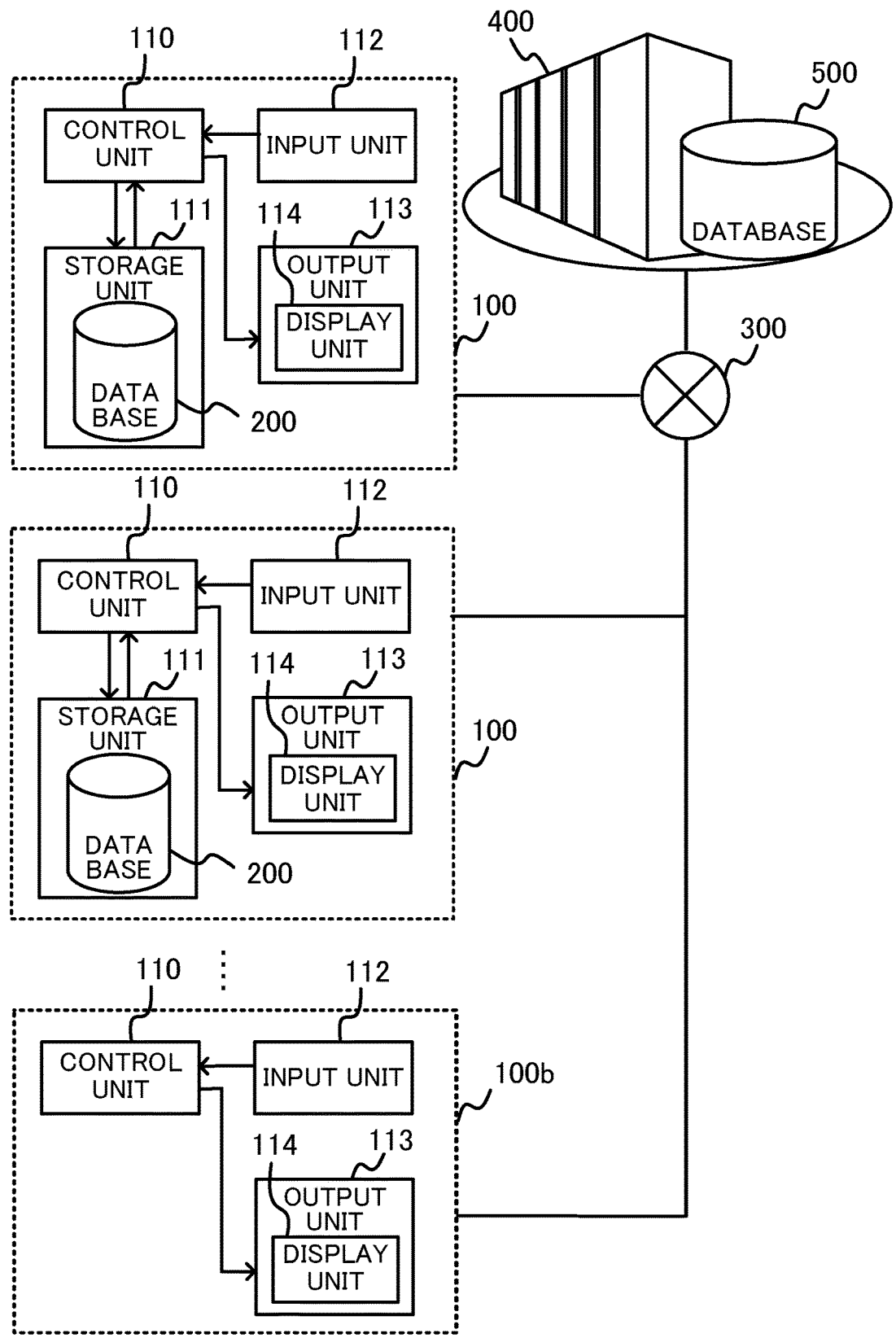
FIG. 18 is a view illustrating a configuration of a system including the apparatus.
Figure 19:
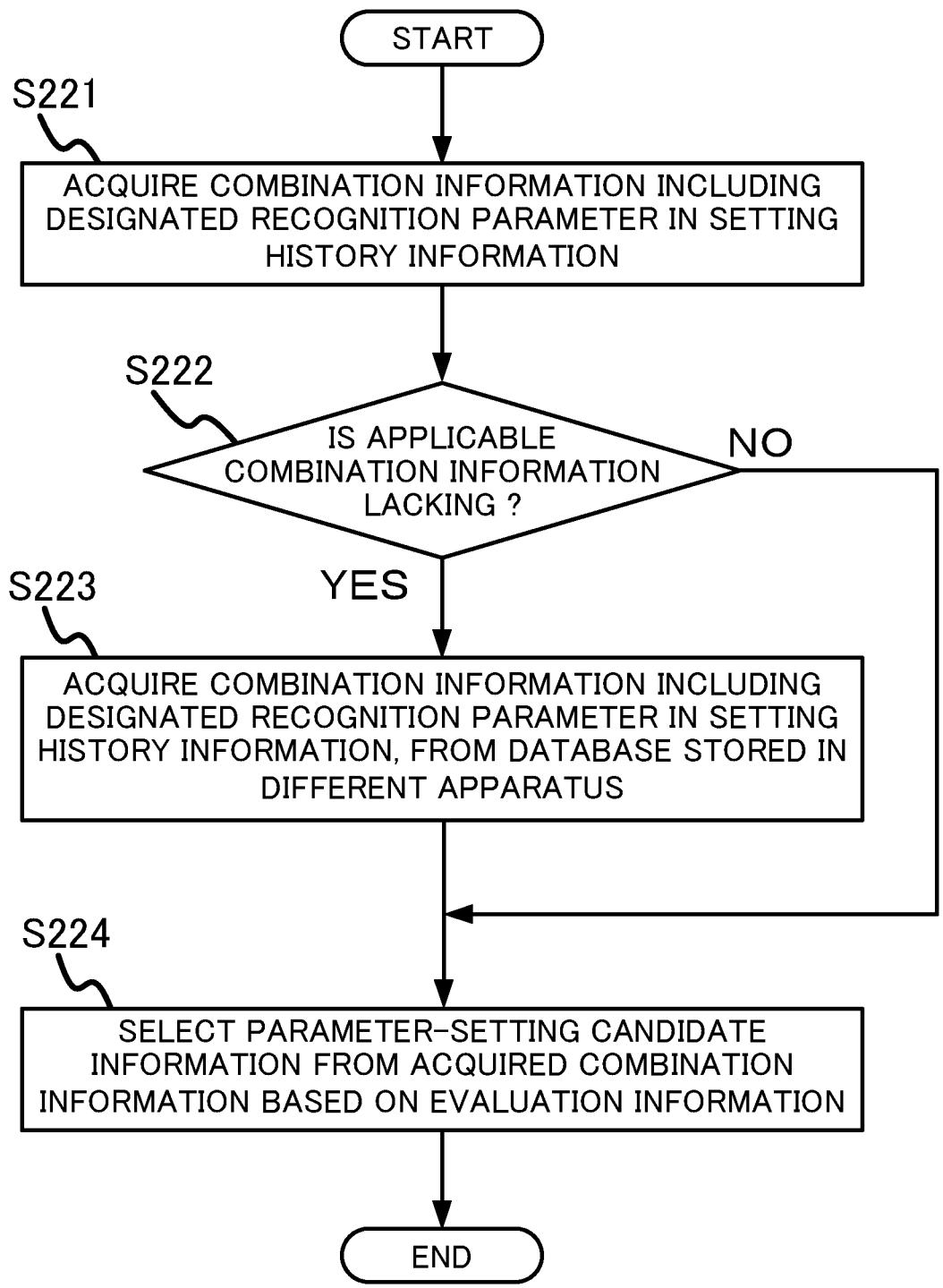
FIG. 19 is a view illustrating another different example of the flowchart of the selecting process performed by the apparatus.

FIG. 18 is a view illustrating a configuration of a system including the apparatus 100. FIG. 19 is a view illustrating another different example of the flowchart of the selecting process (step S20) performed by the apparatus 100. A different modification of the selecting process performed by the apparatus 100 will be described with reference to FIGS. 18 and 19.

While the example in which the apparatus 100 operates solely has been described above, the apparatus 100 may implement the above-described functions by communicating with another apparatus as necessary. For example, as illustrated in FIG. 18, the apparatus 100 may communicate with a server 400 via a network 300 and may refer to a database 500 stored in the server 400. The database 500 may have a configuration similar to that of the database 200, and may include, for example, respective pieces of setting history information in a plurality of apparatuses 100. Additionally, the database 500 is an example of a second database that is stored in a storage unit of an apparatus (the server 400) different from the apparatus 100 and is a database about a parameter-setting history of image analysis that analyzes a cell image.

In the selecting process illustrated in FIG. 19, upon selection of a recognition parameter, first, the apparatus 100 acquires combination information including the recognition parameter designated in the step S10 in FIG. 4 in the setting history information 210 in the database 200 (step S221). This step is similar to the step S21 illustrated in FIG. 6.

Thereafter, the control unit 110 of the apparatus 100 determines whether or not any applicable combination information is included in the database 200 (step S222). When one or more pieces of combination information are acquired in the step S221, parameter-setting candidate information is selected from the pieces of combination information having been acquired in the step S221, based on the evaluation information 220 (step S224).

When no combination information is acquired in the step S221, the control unit 110 acquires combination information including the designated recognition parameter in the setting history information, from the database 500 stored in the different apparatus (step S223). That is, the control unit 110 performs the same process as performed on the database 200 in the step S221, on the database 500. Thereafter, the control unit 110 selects parameter-setting candidate information from the combination information acquired in the step S221 based on the evaluation information 220 (step S224).

In a case where the combination information including the first parameter selected as the recognition parameter is not included in the database 200, not the selecting process illustrated in FIG. 6, but the selecting process illustrated in FIG. 19 is performed. Thus, the control unit 110 selects parameter-setting candidate information by referring to the second database (database 500) that is stored in a storage unit of an apparatus (server 400) different from the apparatus 100 and is a database about the parameter-setting history of image analysis that analyzes a cell image. As a result, also in a period before the evaluation information is sufficiently accumulated in the specific apparatus 100, such as a period immediately after the start of operation of the specific apparatus 100, for example, it is possible to support setting using the history information by utilizing the evaluation information obtained in the other apparatus 100.

Additionally, as illustrated in FIG. 18, the system may include an apparatus 100b that does not have the database 200 within itself on the precondition that the database 500 for a network is used. The apparatus 100b is different from the apparatus 100 in that the steps S221 and S222 in FIG. 19 are omitted and the steps S223 and S224 are performed.

Figure 20:
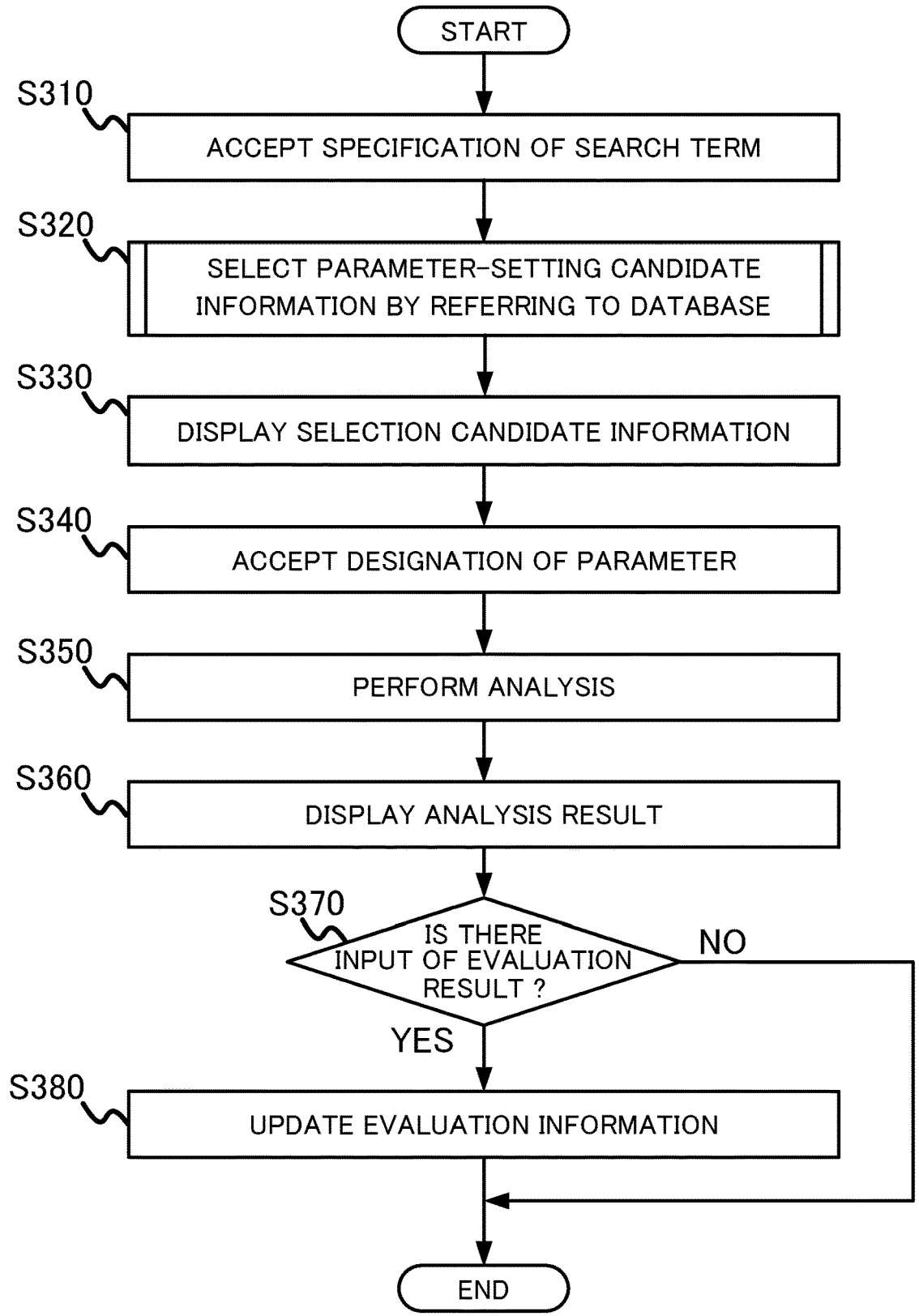
FIG. 20 is a view illustrating a different example of the flowchart of the process performed by the apparatus.
Figure 21:
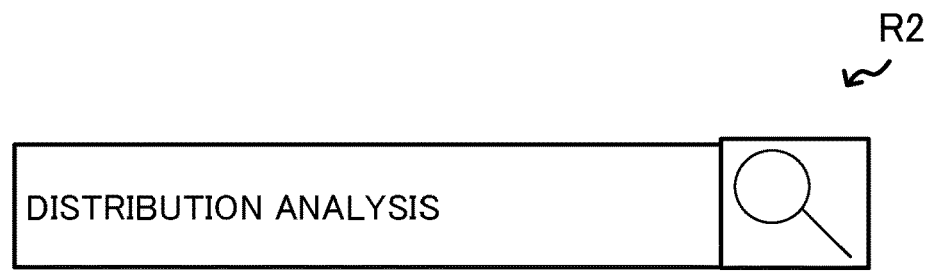
FIG. 21 is a view for explaining a method of specifying a search term.
Figure 22:
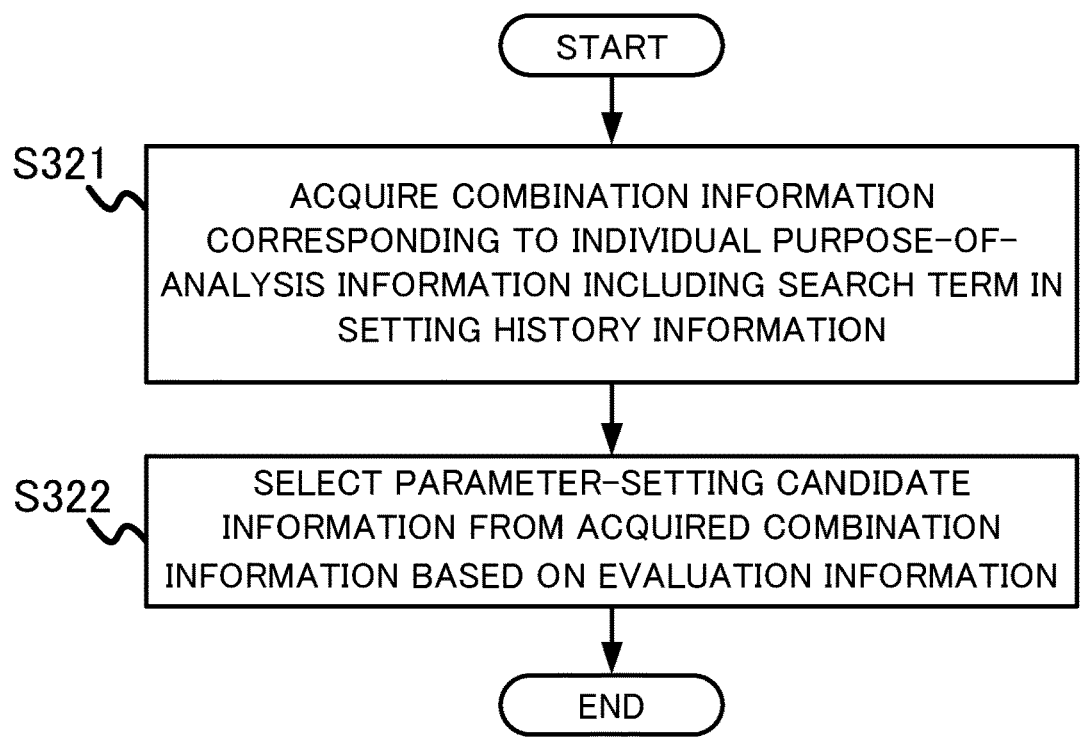
FIG. 22 is a view illustrating still another different example of the flowchart of the selecting process performed by the apparatus.

FIG. 20 is a view illustrating a different example of the flowchart of the process performed by the apparatus 100. FIG. 21 is a view for explaining a method of specifying a search term. FIG. 22 is a view illustrating still another different example of the flowchart of the selecting process performed by the apparatus 100. Below, with reference to FIGS. 20 to 22, a modification of the processes performed by the apparatus 100 will be described.

While the example has been shown above in which the apparatus 100 displays selection candidate information upon a user's designation of a recognition parameter, the apparatus 100 may display selection candidate information upon input of information different from a recognition parameter, such as a search term as described below, for example.

In the process illustrated in FIG. 20, when the display unit 114 displays the window W1 illustrated in FIG. 1, first, the apparatus 100 accepts designation of a search term (step S310). In the step S310, when a user inputs a search term into the UI control in the area R2 as illustrated in FIG. 21, the input unit 112 accepts the specification of the search term. Hereinafter, a case where the user inputs "distribution analysis" as the search term will be described as an example.

When accepting the designation of the search term, the apparatus 100 performs a selecting process illustrated in FIG. 22 of selecting parameter-setting candidate information by referring to the database 200 (step S320). In the selecting process, first, the control unit 110 acquires combination information that is included in the setting history information 210 in the database 200 and corresponds to individual purpose-of-analysis information including the search term having been input in the step S210 in the purpose-of-analysis information 240 (step S321). Specifically, pieces of individual purpose-of-analysis information indicating "distribution analysis of Spheroid" and "distribution analysis of nucleus" in the purpose-of-analysis information 240 illustrated in FIG. 3, for example, are acquired, and combination information (for example, "Spheroid"-"X" and "Y", "Spheroid"-"Total Intensity" and "Y", "Spheroid" and "Nuclear"-"X" and "Y", "Spheroid" and "Nuclear"-"Y") corresponding to the pieces of individual purpose-of-analysis information is further acquired. Additionally, in a case where a purpose of image analysis is selected from options obtained in advance without input of a search term, the control unit 110 may acquire combination information corresponding to individual purpose-of-analysis information indicating the purpose.

Thereafter, the control unit 110 selects parameter-setting candidate information from the combination information acquired in the step S321 based on the evaluation information 220 (step S322). The step S322 is similar to the step S22 in FIG. 6. Additionally, in a case where the evaluation information 220 is not included in the database 200, the parameters included in the combination information acquired in the step S321 may be selected as parameter-setting candidate information. In other words, the control unit 110 can select parameter-setting candidate information based on the combination information acquired in the step S321, in response to either selection of a purpose of analysis through input of a search term, or direct selection of a purpose of analysis.

When the parameter-setting candidate information is selected and the selecting process ends, the apparatus 100 displays the selection candidate information (step S330). The process after the step S330 is similar to that after the step S30 in FIG. 4. Therefore, also with the use of a search term instead of a recognition parameter, a user can efficiently set a parameter that can provide a useful analysis result, only by selecting one from limited options.

Second Embodiment

Figure 23:
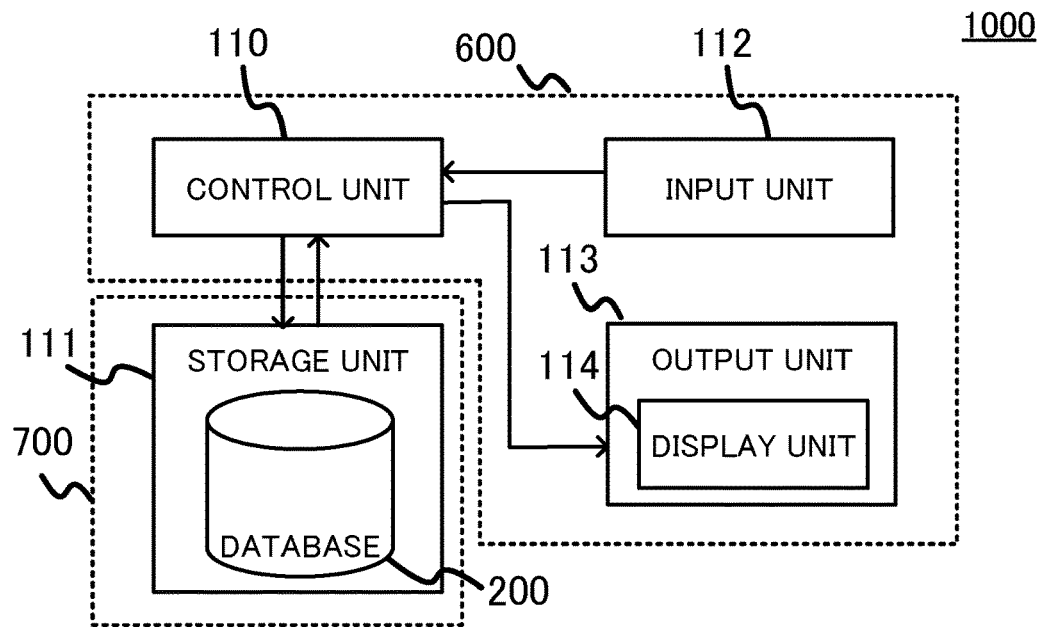
FIG. 23 is a view illustrating a functional configuration of a system according to a second embodiment.

FIG. 23 is a view illustrating a configuration of a system 1000 according to the present embodiment. The system 1000 illustrated in FIG. 23 is a system that supports setting for cell image analysis, and includes an apparatus 600 and an apparatus 700.

The apparatus 600 is an apparatus that supports setting for cell image analysis, and includes the control unit 110, the input unit 112, and the output unit 113. The apparatus 600 is similar to the apparatus 100 according to the first embodiment except that it does not include the storage unit 111. The apparatus 700 includes the storage unit 111, and the storage unit 111 stores therein the database 200. That is, in the second embodiment, the apparatus 600 and the apparatus 700 cooperate with each other, to allow the system 1000 to operate similarly to the apparatus 100 according to the first embodiment. Therefore, also in the present embodiment, in the same manner as in the first embodiment, a user can efficiently set a parameter that can provide useful analysis result, only by selecting one from limited options.

Third Embodiment

Figure 24:
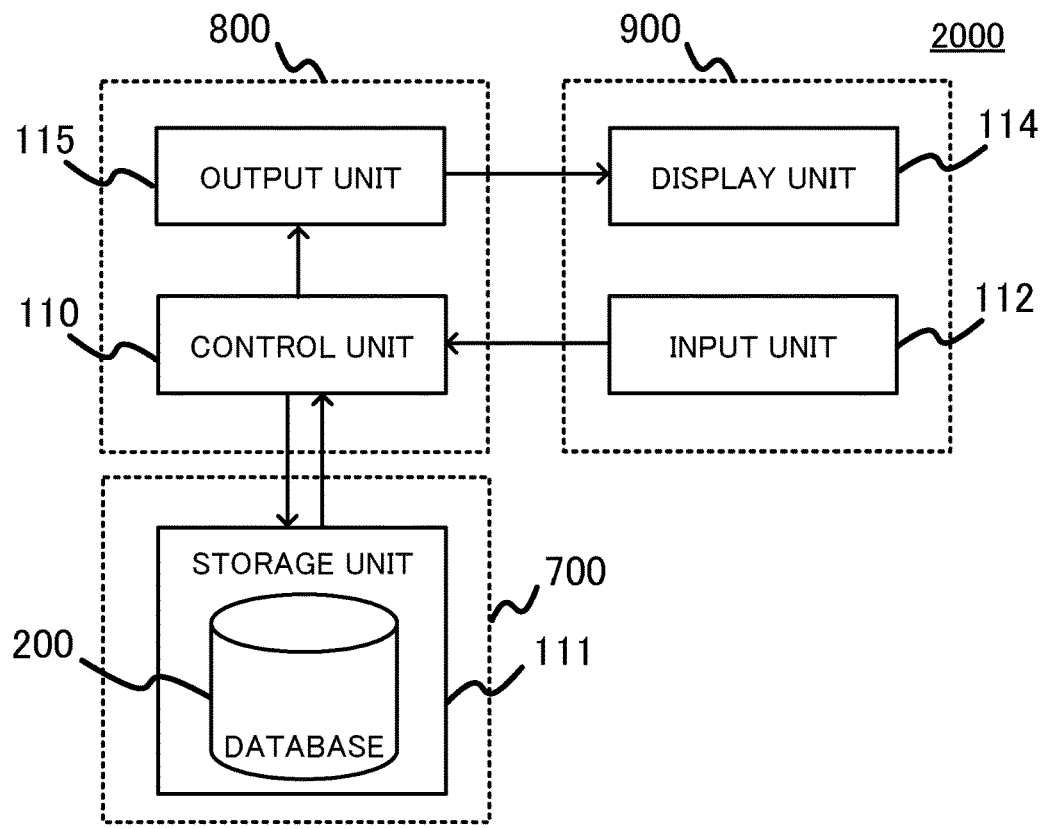
FIG. 24 is a view illustrating a functional configuration of a system according to a third embodiment.

FIG. 24 is a view illustrating a configuration of a system 2000 according to the present embodiment. The system 2000 illustrated in FIG. 24 is a system that supports setting for cell image analysis, and includes an apparatus 800, an apparatus 900, and the apparatus 700.

The apparatus 800 is an apparatus that supports setting for cell image analysis, and includes the control unit 110 and an output unit 115. The apparatus 800 is different from the apparatus 600 according to the second embodiment in that it does not include the input unit 112 and the display unit 114. The apparatus 800 is different from the apparatus 600 according to the second embodiment also in that the output unit 115 does not include the display unit 114. The output unit 115 outputs information to the apparatus 900 including the display unit 114, and the display unit 114 displays the information output from the apparatus 800. The apparatus 900 includes the input unit 112 and the display unit 114, and is a client terminal operated directly by a user. The apparatus 700 is similar to that described in the second embodiment. In the third embodiment, the apparatus 800, the apparatus 900, and the apparatus 700 cooperate with one another, to allow the system 2000 to operate similarly to the system 1000 according to the second embodiment. Therefore, also in the present embodiment, in the same manner as in the first and second embodiments, a user can efficiently set a parameter that can provide a useful analysis result, only by selecting one from limited options.

Figure 25:
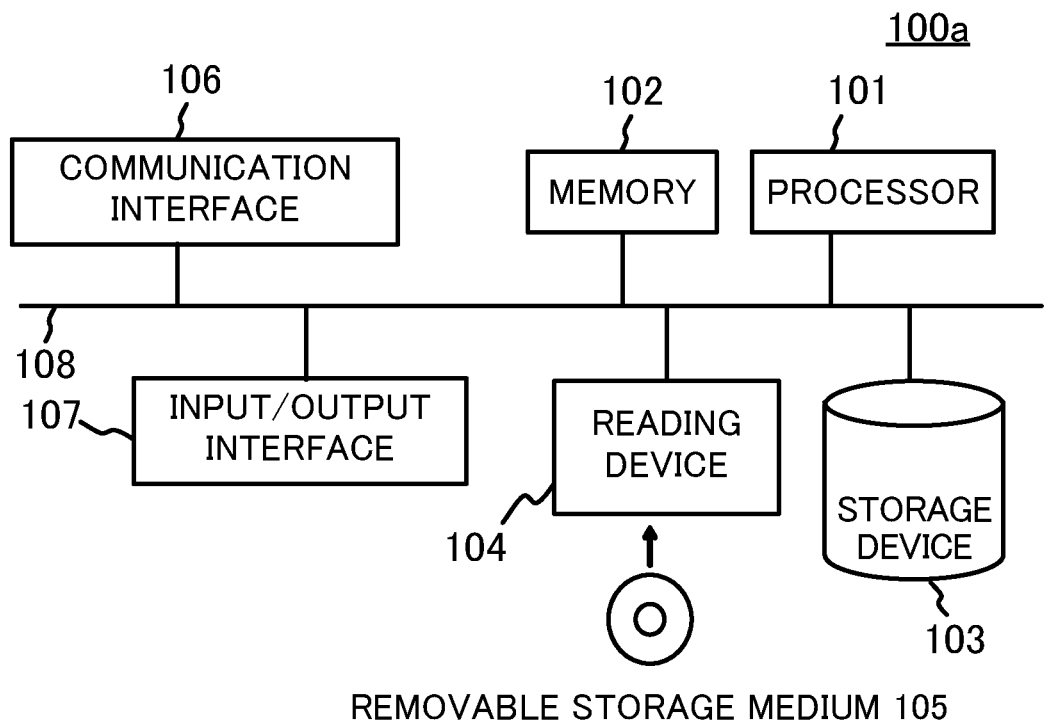
FIG. 25 is a view illustrating a hardware configuration of a computer for implementing the apparatus according to the first embodiment.

FIG. 25 is a view illustrating a hardware configuration of a computer 100a for implementing the apparatus that supports setting for cell image analysis according to the above-described embodiments. As illustrated in FIG. 25, the computer 100a includes, as its hardware configuration, a processor 101, a memory 102, a storage device 103, a reading device 104, a communication interface 106, and an input/output interface 107. Additionally, the processor 101, the memory 102, the storage device 103, the reading device 104, the communication interface 106, and the input/output interface 107 are connected to one another via a bus 108, for example. Further, the computer 100a may include a display device connected to the input/output interface 107. The display device corresponds to the above-described display unit 114 and may be a display such as a liquid crystal display, an organic EL display, or a CRT display, for example. Further, the display device corresponds to the display unit 114 and the input unit 112, and may be a touch panel display, for example.

The processor 101 may be a single processor, a multiprocessor, or a multicore processor, for example. The processor 101 reads out a program stored in the storage device 103 and executes the program, to operate as the above-described control unit 110.

The memory 102 is a semiconductor memory, for example, and may include a RAM section and a ROM section. The storage device 103 is a hard disk, a semiconductor memory such as a flash memory, or an external storage device, for example.

The reading device 104 accesses a removable storage medium 105 in accordance with an instruction from the processor 101, for example. The removable storage medium 105 is implemented by a semiconductor device, a medium to/from which information is magnetically input/output, a medium to/from which information is optically input/output, or the like, for example. Additionally, a semiconductor device is a universal serial bus (USB) memory, for example. Further, a medium to/from which information is magnetically input/output is a magnetic disk, for example. A medium to/from which information is optically input/output is a compact disc (CD)-ROM, a digital versatile disk (DVD), a Blu-ray disc (Blu-ray is a registered trademark), or the like, for example.

The communication interface 106 communicates with other devices in accordance with an instruction from the processor 101, for example. The input/output interface 107 is an interface between an input device and an output device, for example. The input device is a device which receives an instruction from a user, such as a keyboard, a mouse, or a touch panel, for example. The output device is a display device such as a display, or an audio device such as a speaker.

The above-described storage unit 111 may include the memory 102, the storage device 103, and the removable storage medium 105, for example. Further, the above-described input unit 112 may include the input/output interface 107. Further, the output unit 113 may include the communication interface 106 and the input/output interface 107.

The program executed by the processor 101 is provided to the computer 100a in the following forms, for example.

(1) A form in which the program has been stored in the storage device 103 in advance.

(2) A form in which the program is provided via the removable storage medium 105.

(3) A form in which the program is provided via a server such as a program server.

Additionally, the hardware configuration of the computer 100a for implementing the apparatus that supports setting for cell image analysis described above with reference to FIG. 25 is a mere example, and the embodiments are not limited to that. For example, a part of the above-mentioned configuration may be removed, or a new constituent may be added thereto. In addition, in another embodiment, a part or all of the above-described functions of the control unit 110 may be implemented as hardware formed of a field programmable gate array (FPGA), a system-on-a-chip (SoC), an application specific integrated circuit (ASIC), a programmable logic device (PLD), and the like, for example.

The above-described embodiments have shown specific examples in order to facilitate the understanding of the invention, and the present invention is not limited to those embodiments. Modifications of the above-described embodiments and alternatives replacing the above-described embodiments can be included. That is, the composing elements in each embodiment can be modified without departing from the gist and the scope of the embodiment. Further, by appropriately combining the plurality of composing elements disclosed in one or more of the embodiments, it is possible to implement a new embodiment. Further, some of the composing elements described in each embodiment may be removed, or some composing elements may be added to the composing elements described in the embodiment. Further, the order of processes in each embodiment may be rearranged in performing them as long as it causes no contradiction. In other words, the apparatuses, the systems, and the methods of the present invention can be variously modified and altered without departing from the scope as recited by the claims.

In the above-described embodiments, the example has been shown in which an apparatus that supports setting for cell image analysis performs cell image analysis. However, an apparatus that performs cell image analysis may be different from an apparatus that supports setting for cell image analysis.

Further, in the above-described embodiments, the example has been shown in which the control unit 110 selects parameter-setting candidate information based on the evaluation information. However, parameter-setting candidate information may be selected based on the number-of-referring times information, in addition to, or instead of, the evaluation information.

Further, in the above-described embodiments, the example has been shown in which the database 200 includes the setting history information 210, the evaluation information 220, the number-of-referring times information 230, the purpose-of-analysis information 240, and other information 250. However, the database 200 may include at least the setting history information 210 and the evaluation information 220. When the database 200 does not include the purpose-of-analysis information, the output unit 113 can output the parameter-setting candidate information selected by the control unit 110 as selection candidate information.

A cell image is a fluorescence image, for example, but is not limited to a fluorescence image. A cell image may be a bright field image, or may be OCT or SHG. Further, luminance analysis, circularity analysis, distribution analysis, number count, and the like have been cited as examples of a purpose of analysis. However, examples of a purpose of analysis may include life/death determination, quality evaluation, flatness, orientation, and the like, for example.

The present specification includes the following inventions.

Note 1.

An apparatus that supports setting for cell image analysis, including:
a control unit configured to select parameter-setting candidate information for image analysis that analyzes a cell image, by referring to a database about a parameter-setting history of the image analysis; and
an output unit, wherein
the database includes:
setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis; and
purpose-of-analysis information that is a collection of pieces of individual purpose-of-analysis information indicating purposes of image analysis using the pieces of combination information,
the control unit, in response to selection of a first parameter as the recognition parameter, selects the parameter-setting candidate information based on combination information including the first parameter in the setting history information, and
the output unit outputs selection candidate information including at least one of the parameter-setting candidate information and the purpose-of-analysis information corresponding to the parameter-setting candidate information.

Note 2.

The apparatus according to the note 1,
the database further includes evaluation information that is a collection of pieces of individual evaluation information indicating evaluation results for the pieces of combination information, and
the control unit selects the parameter-setting candidate information from the combination information including the first parameter in the setting history information based on the evaluation information, in response to the selection of the first parameter as the recognition parameter.

Note 3.

The apparatus according to the note 2,
the output unit includes a display unit, and
the display unit displays the selection candidate information in a display order determined based on the evaluation information corresponding to the selection candidate information.

Note 4.

The apparatus according to the note 3,
the output unit further outputs the evaluation information corresponding to the selection candidate information, and
the display unit displays the selection candidate information together with the evaluation information corresponding to the selection candidate information.

Note 5.

The apparatus according to the note 2,
the output unit includes a display unit,
the output unit further outputs the evaluation information corresponding to the selection candidate information, and
the display unit displays the selection candidate information together with the evaluation information corresponding to the selection candidate information.

Note 6.

The apparatus according to the note 2, wherein
the control unit selects the parameter-setting candidate information from the combination information including the first parameter in the setting history information based on the evaluation information, in response to the selection of the first parameter as the recognition parameter, under a first condition, and
the control unit selects all of the combination information including the first parameter in the setting history information as the parameter-setting candidate information, in response to the selection of the first parameter as the recognition parameter, under a second condition in which the first condition is not satisfied.

Note 7.

The apparatus according to the note 6, wherein
the output unit includes a display unit.
the database further includes number-of-referring times information that is a collection of pieces of individual number-of-referring times information indicating the numbers of times of referring to the pieces of combination information, and
the display unit displays the selection candidate information in a display order determined based on the number-of-referring times information corresponding to the selection candidate information under the second condition.

Note 8.

The apparatus according to any of the notes 1 to 7, wherein the control unit controls update of the database based on a new evaluation result yielded after first image analysis that analyzes the cell image, the new evaluation result being a newly-provided result of evaluation of combination information indicating a combination of parameters set in the first image analysis.

Note 9.

The apparatus according to any of the notes 2 to 6, wherein
the individual evaluation information includes:
first evaluation information about the number of evaluations each yielding a specific evaluation result among evaluations of combination information corresponding to the individual evaluation information; and
second evaluation information about the number of evaluations of the combination information corresponding to the individual evaluation information.

Note 10.

The apparatus according to any of the notes 2 to 6, wherein
the individual evaluation information includes third evaluation information about a comprehensive evaluation result for combination information corresponding to the individual evaluation information.

Note 11.

The apparatus according to any of the notes 1 to 10, further comprising
a storage unit in which the database is stored.

Note 12.

The apparatus according to the note 11, wherein
the control unit selects the parameter-setting candidate information by referring to a second database that is stored in a storage unit of an apparatus different from the apparatus and is a database about a parameter-setting history of image analysis that analyzes a cell image, when the database does not include the combination information including the first parameter selected as the recognition parameter.

Note 13.

The apparatus according to any of the notes 1 to 10, wherein
the database is stored in a storage unit provided in an apparatus different from the apparatus, and
the control unit refers to the database by communicating with the different apparatus.

Note 14.

A system that supports setting for cell image analysis, comprising:
a storage unit in which a database about a parameter-setting history of image analysis that analyzes a cell image is stored;
a control unit configured to select parameter-setting candidate information for the image analysis by referring to the database; and
a display unit, wherein
the database includes:
setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis; and
purpose-of-analysis information that is a collection of pieces of individual purpose-of-analysis information indicating purposes of image analysis using the pieces of combination information,
the control unit, in response to selection of a first parameter as the recognition parameter, selects the parameter-setting candidate information based on combination information including the first parameter in the setting history information, and
the display unit displays selection candidate information including at least one of the parameter-setting candidate information and the purpose-of-analysis information corresponding to the parameter-setting candidate information.

Note 15.

The system according to the note 14, wherein
the database further includes evaluation information that is a collection of pieces of individual evaluation information indicating evaluation results for the pieces of combination information, and
the control unit selects the parameter-setting candidate information from the combination information including the first parameter in the setting history information based on the evaluation information, in response to the selection of the first parameter as the recognition parameter.

Note 16.

A method of supporting setting for cell image analysis, executed by a computer, including:
selecting parameter-setting candidate information for image analysis that analyzes a cell image, by referring to a database about a parameter-setting history of the image analysis; and
outputting selection candidate information, wherein
the database includes:
setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis; and
purpose-of-analysis information that is a collection of pieces of individual purpose-of-analysis information indicating purposes of image analysis using the pieces of combination information,
the selecting the parameter-setting candidate information includes, in response to selection of a first parameter as the recognition parameter, selecting the parameter-setting candidate information based on combination information including the first parameter in the setting history information, and
the outputting the selection candidate information includes outputting information including at least one of the parameter-setting candidate information and the purpose-of-analysis information corresponding to the parameter-setting candidate information, as the selection candidate information.

Note 17.

The method according to the note 16, wherein
the database further includes evaluation information that is a collection of pieces of individual evaluation information indicating evaluation results for the pieces of combination information, and
the selecting the parameter-setting candidate information based on the combination information including the first parameter includes selecting the parameter-setting candidate information from the combination information including the first parameter in the setting history information, based on the evaluation information.

Note 18.

An apparatus that supports setting for cell image analysis, including:
a control unit configured to select parameter-setting candidate information for image analysis that analyzes a cell image, by referring to a database about a parameter-setting history of the image analysis; and
an output unit configured to output the parameter-setting candidate information selected by the control unit, wherein
the database includes:
setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis; and
purpose-of-analysis information that is a collection of pieces of individual purpose-of-analysis information indicating purposes of image analysis using the pieces of combination information, and
the control unit, in response to selection of a purpose of the image analysis, selects the parameter-setting candidate information based on combination information corresponding to individual purpose-of-analysis information indicating the selected purpose of the image analysis.

Note 19.
The apparatus according to the note 18,
the database further includes evaluation information that is a collection of pieces of individual evaluation information indicating evaluation results for the pieces of combination information, and
the control unit selects the parameter-setting candidate information from the combination information corresponding to the individual purpose-of-analysis information indicating the selected purpose of the image analysis, based on the evaluation information, in response to the selection of the purpose of the image analysis.

Note 20.
A system that supports setting for cell image analysis, including:
a storage unit in which a database about a parameter-setting history of image analysis that analyzes a cell image is stored;
a control unit configured to select parameter-setting candidate information for the image analysis by referring to the database; and
a display unit configured to display the parameter-setting candidate information selected by the control unit, wherein
the database includes:
setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis; and
purpose-of-analysis information that is a collection of pieces of individual purpose-of-analysis information indicating purposes of image analysis using the pieces of combination information, and
the control unit, in response to selection of a purpose of the image analysis, selects the parameter-setting candidate information based on combination information corresponding to individual purpose-of-analysis information indicating the selected purpose of the image analysis.

Note 21.
The system according to the note 20,
the database further includes evaluation information that is a collection of pieces of individual evaluation information indicating evaluation results for the pieces of combination information, and
the control unit selects the parameter-setting candidate information from the combination information corresponding to the individual purpose-of-analysis information indicating the selected purpose of the image analysis, based on the evaluation information, in response to the selection of the purpose of the image analysis.

Note 22.
A method of supporting setting for cell image analysis, executed by a computer, including:
selecting parameter-setting candidate information for image analysis that analyzes a cell image, by referring to a database about a parameter-setting history of the image analysis; and
outputting the selected parameter-setting candidate information, wherein
the database includes:
setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis; and
purpose-of-analysis information that is a collection of pieces of individual purpose-of-analysis information indicating purposes of image analysis using the pieces of combination information, and
the selecting the parameter-setting candidate information includes selecting, in response to selection of a purpose of the image analysis, the parameter-setting candidate information based on combination information corresponding to individual purpose-of-analysis information indicating the selected purpose of the image analysis.

Note 23.
The method according to the note 22, wherein
the database further includes evaluation information that is a collection of pieces of individual evaluation information indicating evaluation results for the pieces of combination information, and
the selecting the parameter-setting candidate information based on the combination information corresponding to the individual purpose-of-analysis information indicating the selected purpose of the image analysis includes selecting the parameter-setting candidate information from the combination information corresponding to the individual purpose-of-analysis information indicating the selected purpose of image analysis, based on the evaluation information.

What is claimed is:
1. An apparatus that supports setting for cell image analysis, comprising:
a processor configured to select parameter-setting candidate information for image analysis that analyzes a cell image, by referring to a database about a parameter-setting history of the image analysis; and
an output unit configured to output the parameter-setting candidate information selected by the processor in a state in which the parameter-setting candidate information is designatable by a user and before the image analysis is performed in accordance with parameters indicated by the parameter-setting candidate information,
wherein
the processor is further configured to receive, by user input, designation of parameters indicated by the output parameter-setting candidate information, and perform image analysis on the cell image in accordance with the parameters designated by the user input,
the database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis,
the processor is configured to, in response to selection of a first parameter as the recognition parameter, select the parameter-setting candidate information based on com- bination information including the first parameter in the setting history information, the database further includes evaluation information that is a collection of pieces of individual evaluation information indicating evaluation results for the pieces of combination information, and the processor is configured to select the parameter-setting candidate information from the combination information including the first parameter in the setting history information based on the evaluation information, in response to the selection of the first parameter as the recognition parameter.

2. The apparatus according to claim 1, wherein
the output unit includes a display unit, and
the display unit displays the parameter-setting candidate information in a display order determined based on the evaluation information corresponding to the parameter-setting candidate information.

3. The apparatus according to claim 2, wherein
the output unit further outputs the evaluation information corresponding to the parameter-setting candidate information, and
the display unit displays the parameter-setting candidate information together with the evaluation information corresponding to the parameter-setting candidate information.

4. The apparatus according to claim 1, wherein
the output unit includes a display unit,
the output unit further outputs the evaluation information corresponding to the parameter-setting candidate information, and
the display unit displays the parameter-setting candidate information together with the evaluation information corresponding to the parameter-setting candidate information.

5. The apparatus according to claim 1, wherein
the processor is configured to select the parameter-setting candidate information from the combination information including the first parameter in the setting history information based on the evaluation information, in response to the selection of the first parameter as the recognition parameter, under a first condition, and
the processor is configured to select all of the combination information including the first parameter in the setting history information as the parameter-setting candidate information, in response to the selection of the first parameter as the recognition parameter, under a second condition in which the first condition is not satisfied.

6. The apparatus according to claim 5, wherein
the output unit includes a display unit,
the database further includes number-of-referring times information that is a collection of pieces of individual number-of-referring times information indicating the numbers of times of referring to the pieces of combination information, and
the display unit displays the parameter-setting candidate information in a display order determined based on the number-of-referring times information corresponding to the parameter-setting candidate information under the second condition.

7. The apparatus according to claim 1, wherein
the processor is configured to control update of the database based on a new evaluation result yielded after first image analysis that analyzes the cell image, the new evaluation result being a newly-provided result of evaluation of combination information indicating a combination of parameters set in the first image analysis.

8. The apparatus according to claim 1, wherein
the individual evaluation information includes:
first evaluation information about the number of evaluations each yielding a specific evaluation result among evaluations of combination information corresponding to the individual evaluation information; and
second evaluation information about the number of evaluations of the combination information corresponding to the individual evaluation information.

9. The apparatus according to claim 1, wherein
the individual evaluation information includes third evaluation information about a comprehensive evaluation result for the combination information corresponding to the individual evaluation information.

10. The apparatus according to claim 1, further comprising
a storage unit in which the database is stored.

11. The apparatus according to claim 1, wherein the database comprises a first database and a second database,
wherein the apparatus further comprises a storage unit which stores the first database,
wherein the second database is stored in a storage unit of another apparatus different from the present apparatus, and
wherein the processor is configured to select the parameter-setting candidate information by referring to the second database, when the first database does not include combination information including the first parameter selected as the recognition parameter.

12. The apparatus according to claim 1, wherein
the database is stored in a storage unit provided in an apparatus different from the apparatus, and
the processor is configured to refer to the database by communicating with the different apparatus.

13. The apparatus according to claim 1, wherein
the database further includes purpose-of-analysis information that is a collection of pieces of individual purpose-of-analysis information indicating purposes of image analysis using the pieces of combination information, and
the output unit further outputs the purpose-of-analysis information corresponding to the parameter-setting candidate information selected by the processor.

14. A system that supports setting for cell image analysis, comprising:
a storage unit in which a database about a parameter-setting history of image analysis that analyzes a cell image is stored;
a processor configured to select parameter-setting candidate information for the image analysis by referring to the database; and
a display unit configured to display the parameter-setting candidate information selected by the processor in a state in which the parameter-setting candidate information is designatable by a user and before the image analysis is performed in accordance with parameters indicated by the parameter-setting candidate information,
wherein
the processor is further configured to receive, by user input, designation of parameters indicated by the output parameter-setting candidate information, and perform image analysis on the cell image in accordance with the parameters designated by the user input, the database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis, and the processor is configured to, in response to selection of a first parameter as the recognition parameter, select the parameter-setting candidate information based on combination information including the first parameter in the setting history information, the database further includes evaluation information that is a collection of pieces of individual evaluation information indicating evaluation results for the pieces of combination information, and the processor is configured to select the parameter-setting candidate information from the combination information including the first parameter in the setting history information based on the evaluation information, in response to the selection of the first parameter as the recognition parameter.

15. A method of supporting setting for cell image analysis, executed by a computer, comprising:

selecting parameter-setting candidate information for image analysis that analyzes a cell image, by referring to a database about a parameter-setting history of the image analysis;

outputting the selected parameter-setting candidate information in a state in which the parameter-setting candidate information is designatable by a user and before the image analysis is performed in accordance with parameters indicated by the parameter-setting candidate information;

receiving, by user input, designation of parameters indicated by the output parameter-setting candidate information, and performing image analysis on the cell image in accordance with the parameters designated by the user input, wherein the database includes setting history information that is a collection of pieces of combination information indicating combinations of parameters having been set in previously-performed image analysis, and is a collection of pieces of combination information including a recognition parameter that specifies an object of image recognition and an analysis parameter that specifies what feature of the object of image recognition is focused on in performing the image analysis, and the selecting the parameter-setting candidate information includes, in response to selection of a first parameter as the recognition parameter, selecting the parameter-setting candidate information based on combination information including the first parameter in the setting history information, the database further includes evaluation information that is a collection of pieces of individual evaluation information indicating evaluation results for the pieces of combination information, and the selecting the parameter-setting candidate information based on the combination information including the first parameter includes selecting the parameter-setting candidate information from the combination information including the first parameter in the setting history information, based on the evaluation information.

* * * * *